United States Patent
Zhang et al.

(10) Patent No.: US 12,524,767 B2
(45) Date of Patent: Jan. 13, 2026

(54) SYSTEM AND METHOD FOR RISK EVALUATION FOR STORE TRANSACTIONS

(71) Applicant: Walmart Apollo, LLC, Bentonville, AR (US)

(72) Inventors: Xuan Zhang, Fremont, CA (US); Fei Ye, San Carlos, CA (US); Shihui Jia, Cupertino, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 72 days.

(21) Appl. No.: 18/509,652

(22) Filed: Nov. 15, 2023

(65) Prior Publication Data
US 2024/0257135 A1 Aug. 1, 2024

Related U.S. Application Data

(60) Provisional application No. 63/442,256, filed on Jan. 31, 2023.

(51) Int. Cl.
*G06Q 40/00* (2023.01)
*G06Q 20/40* (2012.01)

(52) U.S. Cl.
CPC ............... *G06Q 20/4016* (2013.01)

(58) Field of Classification Search
CPC ........... G06Q 20/4016; G06Q 30/0205; G06Q 10/0635; G06Q 20/4015
See application file for complete search history.

(56) References Cited

U.S. PATENT DOCUMENTS

| | | | |
|---|---|---|---|
| 10,692,140 B1* | 6/2020 | Kim | G06Q 20/405 |
| 11,250,444 B2 | 2/2022 | Yao et al. | |
| 11,270,311 B1* | 3/2022 | Jass | G06Q 20/388 |
| 2021/0029137 A1* | 1/2021 | Wright | H04L 63/08 |

(Continued)

FOREIGN PATENT DOCUMENTS

CN 115860482 A 3/2023

OTHER PUBLICATIONS

FDIC (Credit Card Activities Manual, Chapter XIX.—Merchant Processing https://www.fdic.gov/credit-card-activities-manual/chapter-xix-merchant-processing#8sub3, Aug. 24, 2007) (Year: 2007).*

(Continued)

*Primary Examiner* — Mark H Gaw
(74) *Attorney, Agent, or Firm* — Morgan, Lewis & Bockius LLP; Manita Rawat

(57) ABSTRACT

Systems and methods for evaluating risks for physical locations are disclosed. A request for risk evaluation of transactions associated with a physical location located within a predetermined region including a plurality of neighboring locations is received. A spatial model is implemented to generate a first risk score based on chargeback data associated with the physical location and chargeback data of the plurality of neighboring locations. A temporal model is implemented to generate a second risk score for the physical location. A final risk score for the physical location is generated based on the first risk score and the second risk score. The final risk score is transmitted to a computing device for detecting fraudulent transactions associated with the physical location in response to the request.

20 Claims, 15 Drawing Sheets

(56) References Cited

U.S. PATENT DOCUMENTS

2023/0316280 A1* 10/2023 Sardari .............. G06Q 20/4015
705/64

OTHER PUBLICATIONS

V. Ceccato et al., "Crime in Scandinavian Shopping Centre," ResearchGate, Oct. 2017, 36 pages.
V. Ceccato et al., "Are shopping centers risky places?," ResearchGate, Sep. 2021, 44 pages.
A. Amend, "Identifying Financial Fraud With Geospatial Clustering," Datatbricks, Apr. 13, 2021, 18 pages.
de Smith et al., "Geospatial Analysis—A Comprehensive Guide to Principles Techniques and Software Tools," Troubadour Publishing, Ltd. (Year: 2007), 50 pages.

* cited by examiner

SYSTEM AND METHOD FOR RISK EVALUATION FOR STORE TRANSACTIONS

CROSS-REFERENCE TO RELATED APPLICATIONS

This application claims benefit to U.S. Provisional Appl. No. 63/442,256, filed 31 Jan. 2023, entitled System and Method for Risk Evaluation for Store Transactions, the disclosure of which is incorporated herein by reference in its entirety.

TECHNICAL FIELD

This application relates generally to transaction risk evaluation and, more particularly, to systems and methods for evaluating payment risks of store transactions based on spatial and temporal models.

BACKGROUND

Store transactions of a retailer's store can have payment risks due to, e.g. a chargeback for a credit card transaction, a fraud loss, or any fraudulent activity resulting in customer complaints, customer disputes, and/or financial loss to the store. A store transaction may refer to a transaction associated with a store, e.g. an in-store transaction performed by an in-store customer, an online order placed by a user who will pick up the order at a selected store, or an online order placed by a user who will receive the order from a nearby store.

Store risk rating indicates how risky a store is with respect to store transactions, and is one of the most important and intelligent features for detecting, evaluating and mitigating risks of store transactions. Existing methods for calculating a store risk rating focus on a single store's historical fraud loss rate. In many existing methods, established domain expertise or human investigator is required and relied on for determining the store risk rating.

SUMMARY

The embodiments described herein are directed to systems and methods for evaluating payment risks of store transactions based on spatial and temporal models.

In various embodiments, a system including a non-transitory memory configured to store instructions thereon and at least one processor is disclosed. The at least one processor is operatively coupled to the non-transitory memory and configured to read the instructions to: receive a request for risk evaluation of transactions associated with a physical location within a predetermined region including a plurality of neighboring locations; implement a spatial model to generate a first risk score for the physical location based on chargeback data of the physical location and chargeback data of the plurality of neighboring locations; implement a temporal model to generate a second risk score for the physical location; generate a final risk score for the store based on the first risk score and the second risk score; and transmit, in response to the request, the final risk score to a computing device for detecting fraudulent transactions associated with the store.

In various embodiments, a computer-implemented method is disclosed. The computer-implemented method includes: receiving a request for risk evaluation of transactions associated with a physical location within a predetermined region including a plurality of neighboring locations; implementing a spatial model to generate a first risk score for the physical location based on chargeback data of the physical location and chargeback data of the plurality of neighboring locations; implement a temporal model to generate a second risk score for the physical location; generating a final risk score for the store based on the first risk score and the second risk score; and transmitting, in response to the request, the final risk score to a computing device for detecting fraudulent transactions associated with the physical location.

In various embodiments, a non-transitory computer readable medium having instructions stored thereon is disclosed. The instructions, when executed by at least one processor, cause at least one device to perform operations including: receiving a request for risk evaluation of transactions associated with a physical location within a predetermined region including a plurality of neighboring locations; implementing a spatial model to generate a first risk score for the physical location based on chargeback data of the physical location and chargeback data of the plurality of neighboring locations; implement a temporal model to generate a second risk score for the physical location; generating a final risk score for the store based on the first risk score and the second risk score; and transmitting, in response to the request, the final risk score to a computing device for detecting fraudulent transactions associated with the physical location.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
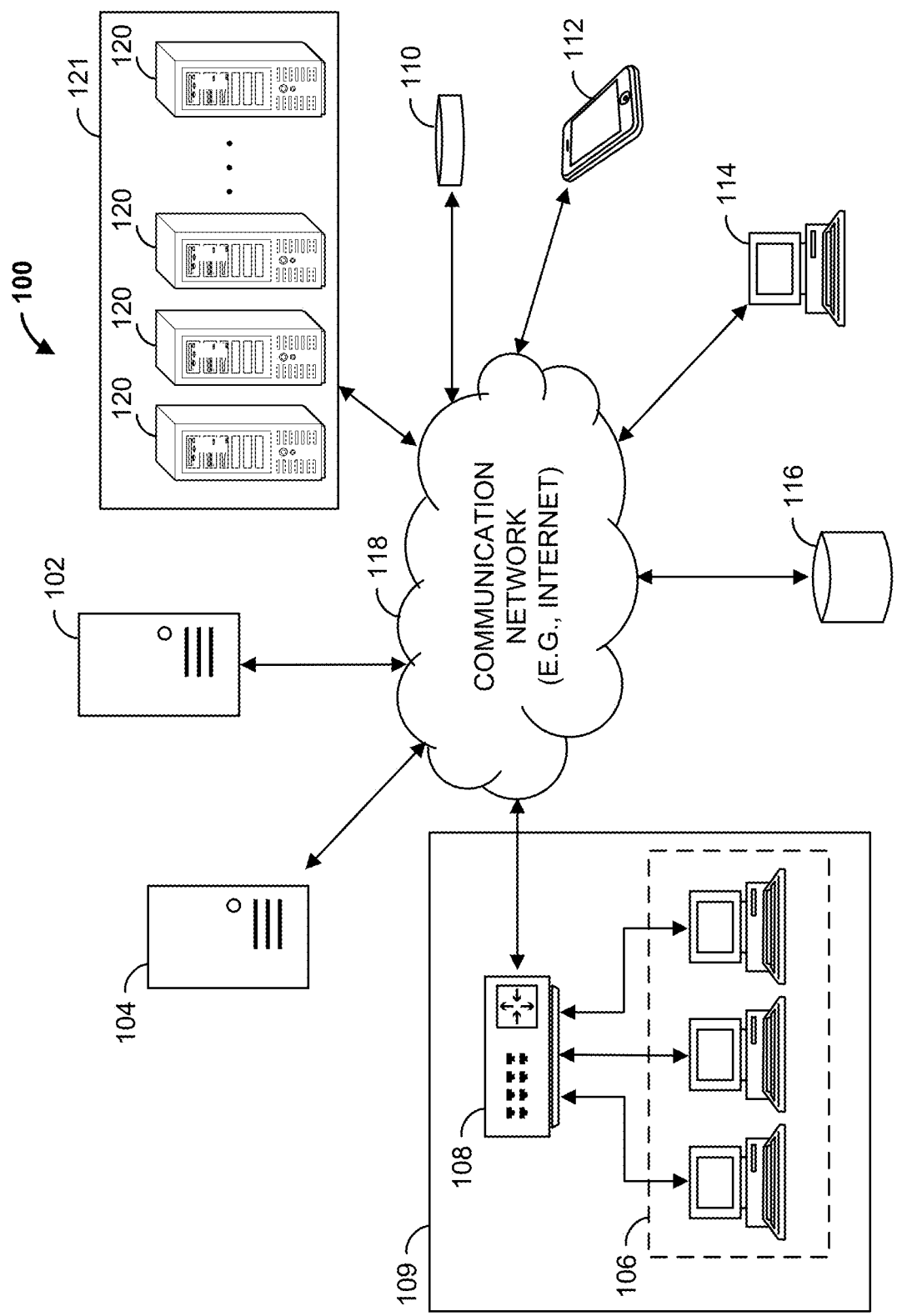
FIG. 1 is a network environment configured to evaluate payment risks of store transactions, in accordance with some embodiments of the present teaching.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

A payment risk may arise from a store transaction due to fraud loss. A store risk rating may be computed based on a single store's historical fraud loss rate to indicate how risky the store is. But fraudsters often travel around neighborhood stores to pick up fraud orders. In addition, fraud loss rate for each store may fluctuate each month and/or each week.

One goal of various embodiments in the present teaching is to enhance or improve store risk ratings, by applying a spatial model and a temporal model to incorporate spatial and temporal factors, respectively. In some embodiments, the spatial model can be used to incorporate a corresponding store's neighborhood stores' fraud loss to enhance the store's risk rating with geospatial techniques, e.g. based on a distance decay model that can extend to include other factors, such as store assortment, accessibility, service, etc.

In some embodiments, the temporal model may be a deep learning sequence model developed to leverage the temporal pattern in the historical signal to enhance the store risk tier prediction accuracy. Attention mechanism is combined with the recurrent neural network of the deep learning sequence model to overcome the limitation that allows the network to identify and attend to the most pertinent historical information when determining the risk tier of a store.

An ensemble approach may be used to incorporate both spatial and temporal factors for risk evaluation of each store. The enhanced store risk ratings, based on both spatial and temporal factors, could be used by a retailer for risk mitigation, facility planning, asset protection, global investigation, etc. Because the computation of the disclosed enhanced store risk ratings relies on the spatial model and deep learning algorithms, it is extensible to areas with less established expertise. While an expertise-based logic can be used for risk evaluation, it might fail when fraudsters exploit the system. However, the disclosed model-based solution can iterate easily and react to updated frauds effectively and efficiently.

Furthermore, in the following, various embodiments are described with respect to methods and systems for evaluating payment risks of store transactions. In some embodiments, a request for risk evaluation of transactions associated with a store of a retailer is received from a computing device. The retailer has a plurality of neighboring stores that are within a same predetermined region as the store. A first risk score is computed for the store based on: a spatial model, chargeback data of the store, and chargeback data of the plurality of neighboring stores. A second risk score is computed for the store based on a temporal model. A final risk score is computed for the store based on: the first risk score and the second risk score. In response to the request, the final risk score is transmitted to the computing device, e.g. for detecting fraudulent transactions associated with the store.

Turning to the drawings, FIG. 1 is a network environment 100 configured to evaluate payment risks of store transactions, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, a payment risk computing device 102 (e.g., a server, such as an application server), a web server 104, a cloud-based engine 121 including one or more processing devices 120, workstation(s) 106, a database 116, and one or more customer computing devices 110, 112, 114 operatively coupled over the network 118. The payment risk computing device 102, the web server 104, the workstation(s) 106, the processing device(s) 120, and the multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the payment risk computing device 102 and processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of one or more processing devices 120 are offered as a cloud-based service (e.g., cloud computing). For example, the cloud-based engine 121 may offer computing and storage resources of the one or more processing devices 120 to the payment risk computing device 102.

In some examples, each of the multiple customer computing devices 110, 112, 114 can be a cellular phone, a smart phone, a tablet, a personal assistant device, a voice assistant device, a digital assistant, a laptop, a computer, or any other suitable device. In some examples, the web server 104 hosts one or more retailer websites. In some examples, the payment risk computing device 102, the processing devices 120, and/or the web server 104 are operated by a retailer, and the multiple customer computing devices 110, 112, 114 are operated by customers of the retailer. In some examples, the processing devices 120 are operated by a third party (e.g., a cloud-computing provider).

The workstation(s) 106 are operably coupled to the communication network 118 via a router (or switch) 108. The workstation(s) 106 and/or the router 108 may be located at a store 109, for example. The workstation(s) 106 can communicate with the payment risk computing device 102 over the communication network 118. The workstation(s) 106 may send data to, and receive data from, the payment risk computing device 102. For example, the workstation(s) 106 may transmit data identifying items purchased by a customer at the store 109 to payment risk computing device 102.

Although FIG. 1 illustrates three customer computing devices 110, 112, 114, the network environment 100 can include any number of customer computing devices 110, 112, 114. Similarly, the network environment 100 can include any number of the payment risk computing devices 102, the processing devices 120, the workstations 106, the web servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

Each of the first customer computing device 110, the second customer computing device 112, and the Nth customer computing device 114 may communicate with the web server 104 over the communication network 118. For example, each of the multiple computing devices 110, 112, 114 may be operable to view, access, and interact with a website, such as a retailer's website, hosted by the web server 104. The web server 104 may transmit user session data related to a customer's activity (e.g., interactions) on the website. For example, a customer may operate one of customer computing devices 110, 112, 114 to initiate a web browser that is directed to the website hosted by the web server 104. The customer may, via the web browser, view item advertisements for items displayed on the website, and may click on item advertisements, for example. The website may capture these activities as user session data, and transmit the user session data to the payment risk computing device 102 over the communication network 118. The website may also allow the operator to add one or more of the items to an online shopping cart, and allow the customer to perform a "checkout" of the shopping cart to purchase the items. In some examples, the web server 104 transmits purchase data identifying items the customer has purchased from the website to the payment risk computing device 102.

In some examples, the web server 104 transmits a risk evaluation request to the payment risk computing device 102. The risk evaluation request may be sent standalone or together with user session data and online purchase data generated in response to the user's action on the website, e.g. interacting (e.g., engaging, clicking, or viewing) with one or more items, adding one or more items to cart, or purchasing one or more items.

In some examples, the payment risk computing device 102 may execute one or more models (e.g., algorithms), such as a machine learning model, deep learning model, statistical model, etc., to determine a payment risk for a transaction. The payment risk computing device 102 may transmit the payment risk data to the web server 104 over the communication network 118, and the web server 104 may determine whether to accept, review or decline this transaction. For example, the payment risk computing device 102 may send a risk score to the web server 104, based on the transaction data including a store (e.g. pick up store, shopping store, or selected store by the user) associated with the transaction. The web server 104 may determine whether the risk score is higher than a threshold. If so, the web server 104 can decline the transaction. If not, the web server 104 may review or accept the transaction.

In an example, a customer places an order on a website hosted by the web server 104, and schedules to pick up the order at a store of a retailer. The web server 104 may send a risk evaluation request to the payment risk computing device 102 with e.g. the online purchase data about the transaction and the store. In response to receiving the request, the payment risk computing device 102 may execute the one or more processors to compute a payment risk score for the transaction, based on various factors including but not limited to: the store's location, the store's risk score, risk scores of the retailer's other stores in a same region as the store, the store's historical fraud loss data, and the customer's historical transaction data. The payment risk computing device 102 may transmit the payment risk score to the web server 104, which may determine whether to accept, review or decline this transaction. In some embodiments, the payment risk score is computed by the payment risk computing device 102 using one or more pre-trained models stored in the database 116.

In another example, the payment risk computing device 102 may receive store related data from the store 109 of a retailer, including transaction data and fraud loss data (e.g. chargeback data) about the store 109. The payment risk computing device 102 may compute a store risk score for the store 109, based on various factors including but not limited to: the location of the store 109, chargeback (CB) data of the store 109, CB data of the retailer's other stores in a same region as the store 109, historical CB trend of the store 109. In some embodiments, the store risk score is computed by the payment risk computing device 102 using one or more pre-trained models stored in the database 116. The payment risk computing device 102 may transmit the store risk score to the store 109, which may determine whether to relax or tighten a fraud control on the transactions associated with the store 109.

The payment risk computing device 102 is further operable to communicate with the database 116 over the communication network 118. For example, the payment risk computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the payment risk computing device 102, in some examples, the database 116 can be a local storage device, such as a hard drive, a non-volatile memory, or a USB stick. The payment risk computing device 102 may store purchase data received from the web server 104 in the database 116. The payment risk computing device 102 may receive store related data from different stores 109 and store them as store data in the database 116. The payment risk computing device 102 may also receive from the web server 104 user session data identifying events associated with browsing sessions, and may store the user session data in the database 116.

In some examples, the payment risk computing device 102 generates training data for a plurality of models (e.g., machine learning models, deep learning models, statistical models, algorithms, etc.) based on historical user session data, transaction data, and/or store data. The payment risk computing device 102 trains the models based on their corresponding training data, and the payment risk computing device 102 stores the models in a database, such as in the database 116 (e.g., a cloud storage).

The models, when executed by the payment risk computing device 102, allow the payment risk computing device 102 to determine risks for each store or for each transaction associated with a store. For example, the payment risk computing device 102 may obtain the models from the database 116. The payment risk computing device 102 may receive weekly store data, including CB rate of a latest week, from a store. In response to receiving the weekly store data, the payment risk computing device 102 may execute the models to determine an updated store risk score for the store. The updated store risk score may indicate how risky the store is with respect to its store transactions.

In some examples, the payment risk computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, the payment risk computing device 102 may generate a store risk score for each store.

Figure 2:
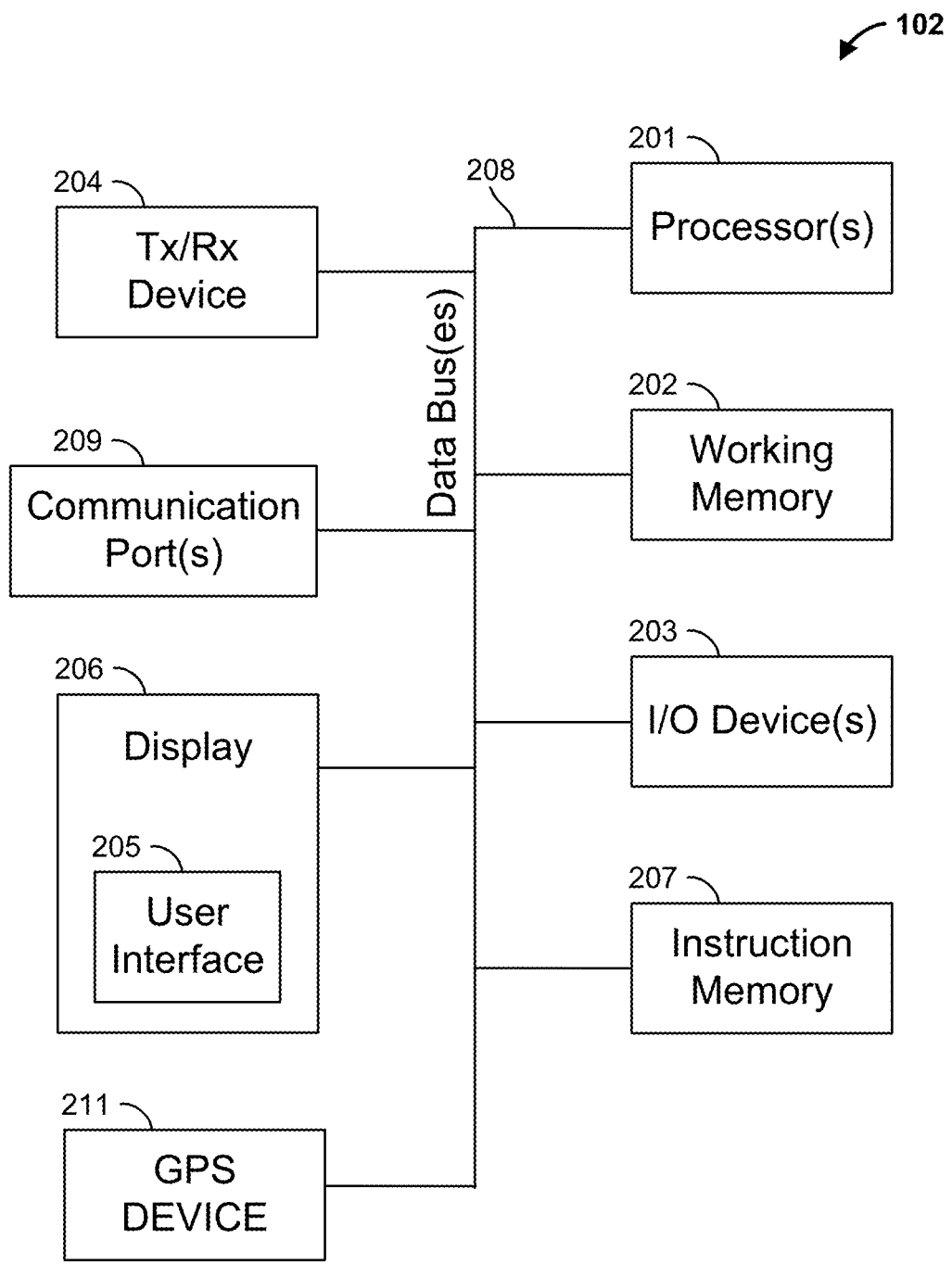
FIG. 2 is a block diagram of a payment risk computing device, in accordance with some embodiments of the present teaching.

FIG. 2 illustrates a block diagram of a payment risk computing device, e.g. the payment risk computing device 102 of FIG. 1, in accordance with some embodiments of the present teaching. In some embodiments, each of the payment risk computing device 102, the web server 104, the workstation(s) 106, the multiple customer computing devices 110, 112, 114, and the one or more processing devices 120 in FIG. 1 may include the features shown in FIG. 2. Although FIG. 2 is described with respect to the payment risk computing device 102. It should be appreciated, however, that the elements described can be included, as applicable, in any of the payment risk computing device 102, the web server 104, the workstation(s) 106, the multiple customer computing devices 110, 112, 114, and the one or more processing devices 120.

As shown in FIG. 2, the payment risk computing device 102 can include one or more processors 201, a working memory 202, one or more input/output devices 203, an instruction memory 207, a transceiver 204, one or more communication ports 209, a display 206 with a user interface 205, and an optional global positioning system (GPS) device 211, all operatively coupled to one or more data buses 208. The data buses 208 allow for communication among the various devices. The data buses 208 can include wired, or wireless, communication channels.

The processors 201 can include one or more distinct processors, each having one or more cores. Each of the distinct processors can have the same or different structure. The processors 201 can include one or more central processing units (CPUs), one or more graphics processing units (GPUs), application specific integrated circuits (ASICs), digital signal processors (DSPs), and the like.

The instruction memory 207 can store instructions that can be accessed (e.g., read) and executed by the processors 201. For example, the instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. The processors 201 can be configured to perform a certain function or operation by executing code, stored on the instruction memory 207, embodying the function or operation. For example, the processors 201 can be configured to execute code stored in the instruction memory 207 to perform one or more of any function, method, or operation disclosed herein.

Additionally, the processors 201 can store data to, and read data from, the working memory 202. For example, the processors 201 can store a working set of instructions to the working memory 202, such as instructions loaded from the instruction memory 207. The processors 201 can also use the working memory 202 to store dynamic data created during the operation of the payment risk computing device 102. The working memory 202 can be a random access memory (RAM) such as a static random access memory (SRAM) or dynamic random access memory (DRAM), or any other suitable memory.

The input-output devices 203 can include any suitable device that allows for data input or output. For example, the input-output devices 203 can include one or more of a keyboard, a touchpad, a mouse, a stylus, a touchscreen, a physical button, a speaker, a microphone, or any other suitable input or output device.

The communication port(s) 209 can include, for example, a serial port such as a universal asynchronous receiver/transmitter (UART) connection, a Universal Serial Bus (USB) connection, or any other suitable communication port or connection. In some examples, the communication port(s) 209 allows for the programming of executable instructions in the instruction memory 207. In some examples, the communication port(s) 209 allow for the transfer (e.g., uploading or downloading) of data, such as machine learning model training data.

The display 206 can be any suitable display, and may display the user interface 205. The user interfaces 205 can enable user interaction with the payment risk computing device 102. For example, the user interface 205 can be a user interface for an application of a retailer that allows a customer to view and interact with a retailer's website. In some examples, a user can interact with the user interface 205 by engaging the input-output devices 203. In some examples, the display 206 can be a touchscreen, where the user interface 205 is displayed on the touchscreen.

The transceiver 204 allows for communication with a network, such as the communication network 118 of FIG. 1. For example, if the communication network 118 of FIG. 1 is a cellular network, the transceiver 204 is configured to allow communications with the cellular network. In some examples, the transceiver 204 is selected based on the type of the communication network 118 the payment risk computing device 102 will be operating in. The processor(s) 201 is operable to receive data from, or send data to, a network, such as the communication network 118 of FIG. 1, via the transceiver 204.

The optional GPS device 211 may be communicatively coupled to the GPS and operable to receive position data from the GPS. For example, the GPS device 211 may receive position data identifying a latitude, and longitude, from a satellite of the GPS. Based on the position data, the payment risk computing device 102 may determine a local geographical area (e.g., town, city, state, etc.) of its position. Based on the geographical area, the payment risk computing device 102 may determine relevant trend data (e.g., trend data identifying events in the geographical area) and cluster different stores into different regions.

Figure 3:
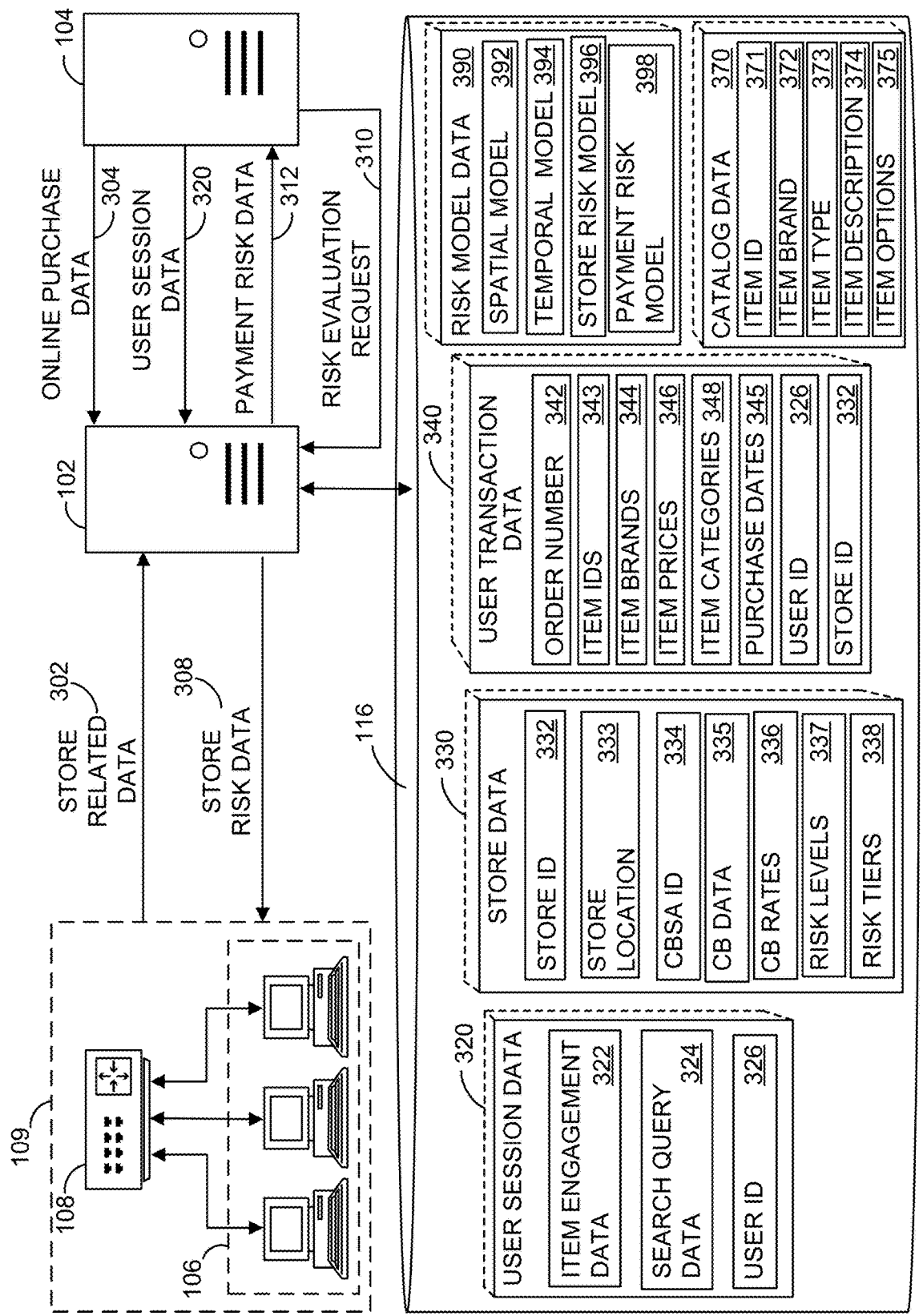
FIG. 3 is a block diagram illustrating various portions of a payment risk evaluation system, in accordance with some embodiments of the present teaching.

FIG. 3 is a block diagram illustrating various portions of a payment risk evaluation system, e.g. the payment risk evaluation system shown in the network environment 100 of FIG. 1, the in accordance with some embodiments of the present teaching. As indicated in FIG. 3, the payment risk computing device 102 may receive user session data 320 from the web server 104, and store the user session data 320 in the database 116. The user session data 320 may identify, for each user (e.g., customer), data related to that user's browsing session, such as when browsing a retailer's webpage hosted by the web server 104.

In some examples, the user session data 320 may include item engagement data 322, search query data 324, and user ID 326 (e.g., a customer ID, retailer website login ID, a cookie ID, etc.). The item engagement data 322 may include one or more of a session ID (i.e., a website browsing session identifier), item clicks identifying items which a user clicked (e.g., images of items for purchase, keywords to filter reviews for an item), items added-to-cart identifying items added to the user's online shopping cart, advertisements viewed identifying advertisements the user viewed during the browsing session, and advertisements clicked identifying advertisements the user clicked on. The search query data 324 may identify one or more searches conducted by a user during a browsing session (e.g., a current browsing session).

The payment risk computing device 102 may also receive online purchase data 304 from the web server 104, which identifies and characterizes one or more online purchases, such as purchases made by the user and other users via a retailer's website hosted by the web server 104. The payment risk computing device 102 may also receive store related data 302 from the store 109, which identifies and characterizes one or more in-store purchases. In some embodiments, the store related data 302 may also indicate other information about the store 109.

The payment risk computing device 102 may parse the store related data 302 and the online purchase data 304 to generate store data 330 and user transaction data 340, respectively. In this example, the store data 330 may include, for each store, one or more of a store ID 332 of the store, a store location 333 of the store, a core based statistical area (CBSA) ID 334 identifying a CBSA where the store belongs to, chargeback (CB) data 335 identifying CB amount (e.g. per month or per week) of the store, CB rates 336 identifying CB percentage ratio (e.g. per month or per week) of the store, risk levels 337 identifying which risk level (e.g. per month or per week) the store is in, and risk tiers 338 identifying which risk tier (e.g. per month or per week) the store is in. In this example, the user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item categories 348 identifying a product type (e.g., category) of each item purchased, a purchase date 345 identifying the purchase date of the purchase order, user ID 326 for the user making the corresponding purchase, and store ID 332 for the pickup store or shipping-from store associated with the corresponding purchase.

The database 116 may further store catalog data 370, which may identify one or more attributes of a plurality of items, such as a portion of or all items a retailer carries. The catalog data 370 may identify, for each of the plurality of items, an item ID 371 (e.g., an SKU number), item brand 372, item type 373 (e.g., grocery item such as milk, clothing item), item description 374 (e.g., a description of the product including product features, such as ingredients, benefits, use or consumption instructions, or any other suitable description), and item options 375 (e.g., item colors, sizes, flavors, etc.).

The database 116 may also store risk model data 390 identifying and characterizing one or more risk models and related data. For example, the risk model data 390 may include a spatial model 392, a temporal model 394, a store risk model 396, and a payment risk model 398. The spatial model 392 may be used to generate a spatially enhanced risk score for a store, while the temporal model 394 may be used to generate a temporally enhanced risk score for the store. The store risk model 396 may be used to generate a final risk score for the store, e.g. based on the spatially enhanced risk score and the temporally enhanced risk score. The payment risk model 398 may be used to generate a payment risk for a transaction associated with a store, e.g. based on the final risk score for the store.

In some examples, the payment risk computing device 102 receives a risk evaluation request 310 from the web server 104. The risk evaluation request 310 may be associated with a transaction on a website hosted by the web server 104. For example, the risk evaluation request 310 may be associated with an order of a user, e.g. after the user placed the order on the website of a retailer. In response, the payment risk computing device 102 generates payment risk data 312 including, e.g. a payment risk score for the order or transaction. The payment risk score may be generated by the payment risk computing device 102 based on a store risk score for a store associated with the order, e.g. the store where the user will pick up the order, the store where the user has selected as a default store, or the store where the order will be shipped from. The store risk score may be computed based on the store risk model 396, taking into consideration both spatial and temporal factors using the spatial model 392 and the temporal model 394, respectively. In some embodiments, the payment risk score may be equal to the store risk score. In some embodiments, the payment risk score may be computed based on both the store risk score and other information, e.g. user information from the user session data 320, time and item information about the transaction from the online purchase data 304 or the user transaction data 340. Then, the payment risk computing device 102 may transmit the payment risk data 312 to the web server 104, which will determine whether to accept, decline or review the transaction based on the payment risk data 312.

In some examples, the payment risk computing device 102 receives store related data 302 from the store 109. The store related data 302 may include or indicate a request for store risk evaluation for the store 109. The store related data 302 may also include updated information for the store data 330, e.g. updated CB data and/or updated CB rate for a most recent week or month for the store 109. In response, the payment risk computing device 102 generates store risk data 308 including, e.g. a store risk score for the store 109. The store risk score may be computed based on the store risk model 396, taking into consideration both spatial and temporal factors using the spatial model 392 and the temporal model 394, respectively, as well as the CD data 335, the CD rates 336, the updated CB data and/or the updated CB rate for the store 109. Then, the payment risk computing device 102 may transmit the store risk data 308 to the store 109, which will determine whether and how to control potential fraudulent transactions associated with the store 109.

In some embodiments, the payment risk computing device 102 may assign one or more of the above described operations to a different processing unit or virtual machine hosted by one or more processing devices 120. Further, the payment risk computing device 102 may obtain the outputs of the these assigned operations from the processing units, and generate the payment risk data 312 and/or the store risk data 308 based on the outputs.

Figure 4:
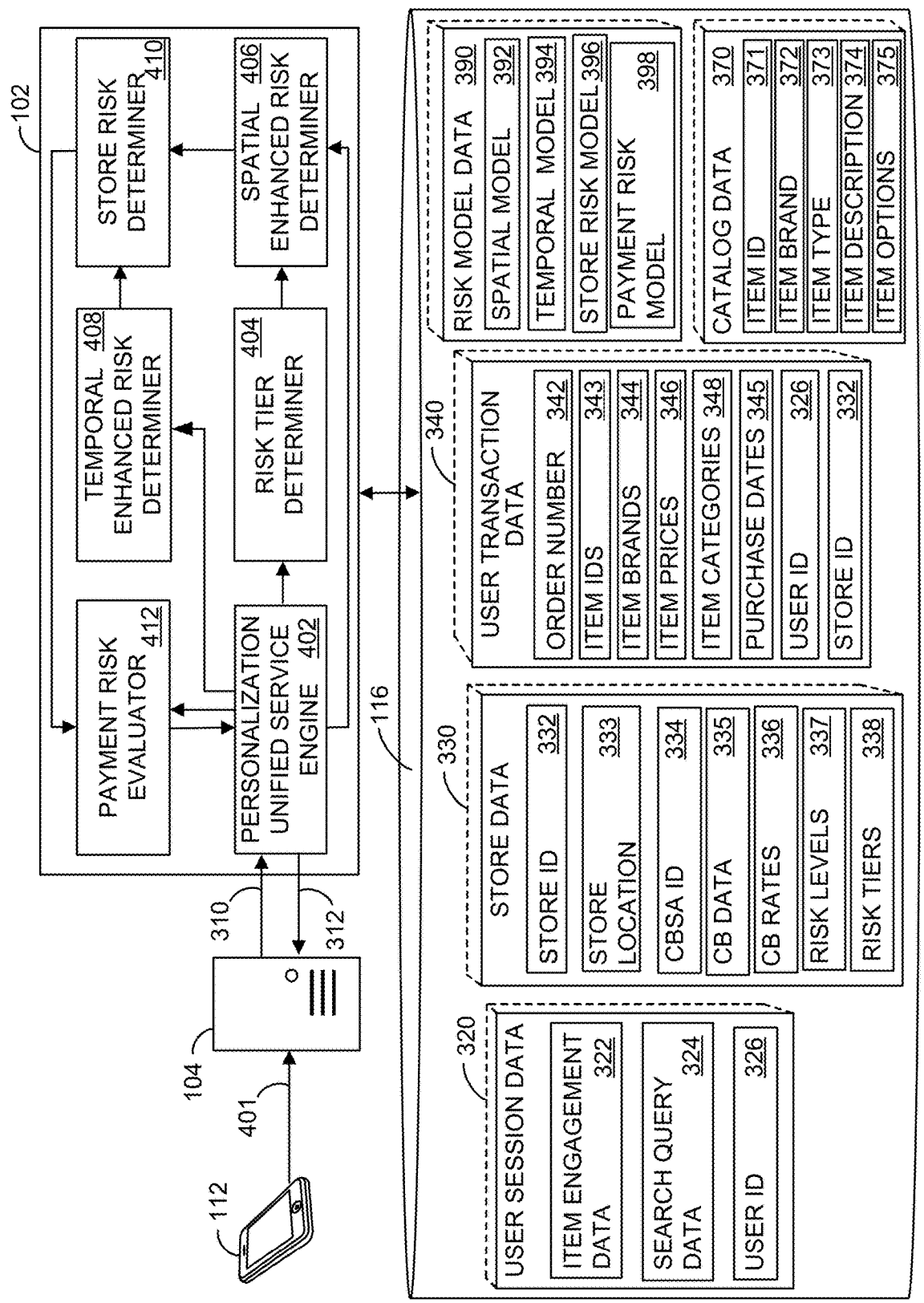
FIG. 4 is a block diagram illustrating various portions of a payment risk computing device, in accordance with some embodiments of the present teaching.

FIG. 4 is a block diagram illustrating a more detailed view of a payment risk computing device, e.g. the payment risk computing device 102 in FIG. 1, in accordance with some embodiments of the present teaching. As shown in FIG. 4, the payment risk computing device 102 includes a personalization unified service engine 402, a risk tier determiner 404, a spatial enhanced risk determiner 406, a temporal enhanced risk determiner 408, a store risk determiner 410, and a payment risk evaluator 412. In some examples, one or more of the personalization unified service engine 402, the risk tier determiner 404, the spatial enhanced risk determiner 406, the temporal enhanced risk determiner 408, the store risk determiner 410 and the payment risk evaluator 412 are implemented in hardware. In some examples, one or more of the personalization unified service engine 402, the risk tier determiner 404, the spatial enhanced risk determiner 406, the temporal enhanced risk determiner 408, the store risk determiner 410 and the payment risk evaluator 412 are implemented as an executable program maintained in a tangible, non-transitory memory, such as instruction memory 207 of FIG. 2, which may be executed by one or processors, such as processor 201 of FIG. 2.

For example, the personalization unified service engine 402 may obtain from the web server 104 a risk evaluation request 310 as a message 401 is sent from the user device 112 to the web server 104, and may execute risk model(s) included in the risk model data 390. The message 401 sent by the user using the user device 112 may indicate an online transaction submitted by the user associated with a store. The risk evaluation request 310 may either include information about the transaction, or indicate the transaction information in the user transaction data 340, including e.g. store ID of the store, user ID of the user (e.g., customer), item prices of the items in the transaction. In some embodiments, the risk evaluation request 310 is to seek a payment risk score to indicate how risky it is to accept the transaction.

In some embodiments, the personalization unified service engine 402 receives the risk evaluation request 310, and receives and parses the user session data 320 (e.g., user session data associated with a current user session of the user in real-time) and/or the user transaction data 340 of the transaction. In some embodiments, the personalization unified service engine 402 may retrieve from the database 116 the store data 330 about the store associated with the transaction, e.g. CB data and CB rates of past several months of the store. The personalization unified service engine 402 may provide to the risk tier determiner 404 the CD data, CB rates, and/or other data, which may include the user transaction data 340 and/or the user session data 320.

In some embodiments, the risk tier determiner 404 can determine a risk tier for the store based on the CB data and CB rates of the store during past several months, e.g. past 3, 6, or 12 months. The risk tier determiner 404 may send the risk tier to the spatial enhanced risk determiner 406 for generating a spatial enhanced risk tier for the store.

In some embodiments, the spatial enhanced risk determiner 406 may receive data from the personalization unified service engine 402 and the risk tier determiner 404. For example, the spatial enhanced risk determiner 406 may receive store location, store ID, and/or CBSA ID of the store of the retailer, either from the personalization unified service engine 402 or directly from the database 116. Based on these information, the spatial enhanced risk determiner 406 can determine whether the retailer has one or more neighboring stores that are within a same predetermined region (e.g. a same CBSA) as the store. If so, the spatial enhanced risk determiner 406 can compute a spatial enhanced risk tier based on: the risk tier received from the risk tier determiner 404, the CB data and CB rates of the one or more neighboring stores, and the spatial model 392 retrieved from the database 116. The spatial enhanced risk determiner 406 can send the spatial enhanced risk tier to the store risk determiner 410 for generating a final store risk score.

In some embodiments, the temporal enhanced risk determiner 408 may receive data from the personalization unified service engine 402. For example, the temporal enhanced risk determiner 408 may receive a time series of CB rates of the store, either from the personalization unified service engine 402 or directly from the database 116. In some embodiments, the temporal enhanced risk determiner 408 may aggregate the CB rates by week and input the aggregated CB rates into the temporal model 394 to predict a future CB rate for the store. The temporal enhanced risk determiner 408 can generate a temporal enhanced risk tier based on the predicted CB rate. In some embodiments, the temporal model 394 may be a deep sequence model trained based on previous transaction and fraud loss data. The temporal enhanced risk determiner 408 can send the temporal enhanced risk tier to the store risk determiner 410 for generating the final store risk score.

In some embodiments, the store risk determiner 410 can compute the final store risk score for the store based on the spatial enhanced risk tier received from the spatial enhanced risk determiner 406 and the temporal enhanced risk tier received from the temporal enhanced risk determiner 408, using the store risk model 396 in the database 116. In some embodiments, the final store risk score is equal to either one of the spatial enhanced risk tier and the temporal enhanced risk tier. In some embodiments, the final store risk score is equal to a combination of the spatial enhanced risk tier and the temporal enhanced risk tier. The store risk determiner 410 can send the final store risk score to the payment risk evaluator 412 for evaluating a payment risk.

In some embodiments, the payment risk evaluator 412 may receive data from the personalization unified service engine 402 and the store risk determiner 410. For example, the payment risk evaluator 412 may receive transaction data of the current transaction and historical user transaction data of the user, either from the personalization unified service engine 402 or directly from the database 116. In some embodiments, the payment risk evaluator 412 may generate a payment risk score for the transaction based on the final store risk score received from the store risk determiner 410 and additional data from the personalization unified service engine 402 or the database 116. For example, the additional data may indicate whether the store is located in a different state than the billing state of the credit card used for the transaction. If so, the payment risk score may indicate a high payment risk for the transaction, even if the store risk is low based on the final store risk score. The additional data may also include the basket size of the transaction, e.g. total money amount of the transaction. If the basket size is larger than a predetermined threshold, a high payment risk arises from the transaction.

The personalization unified service engine 402 may receive the payment risk score from the payment risk evaluator 412 in a data format (e.g., message) acceptable by web server 104. The personalization unified service engine 402 transmits the payment risk data 312 including the payment risk score to the web server 104. The web server 104 may then determine whether to accept, decline, or further review the transaction, e.g. by determining whether the transaction is fraudulent.

In some embodiments, the payment risk computing device 102 may directly send the final store risk score to the web server 104, which will perform a determination on whether to accept, decline, or further review the transaction, based on the final store risk score. For example, the functions of the payment risk evaluator 412 may be performed by the web server 104.

In some embodiments, the risk evaluation request 310 may be generated and transmitted to the payment risk computing device 102 with respect to a store, but without respect to any specific real-time transaction. In this case, the payment risk computing device 102 will directly send the final store risk score of the store to the web server 104, which may use the final store risk score to detect fraudulent transactions associated with the store, e.g. by relaxing or tightening up a fraud control policy for the store.

Figure 5:
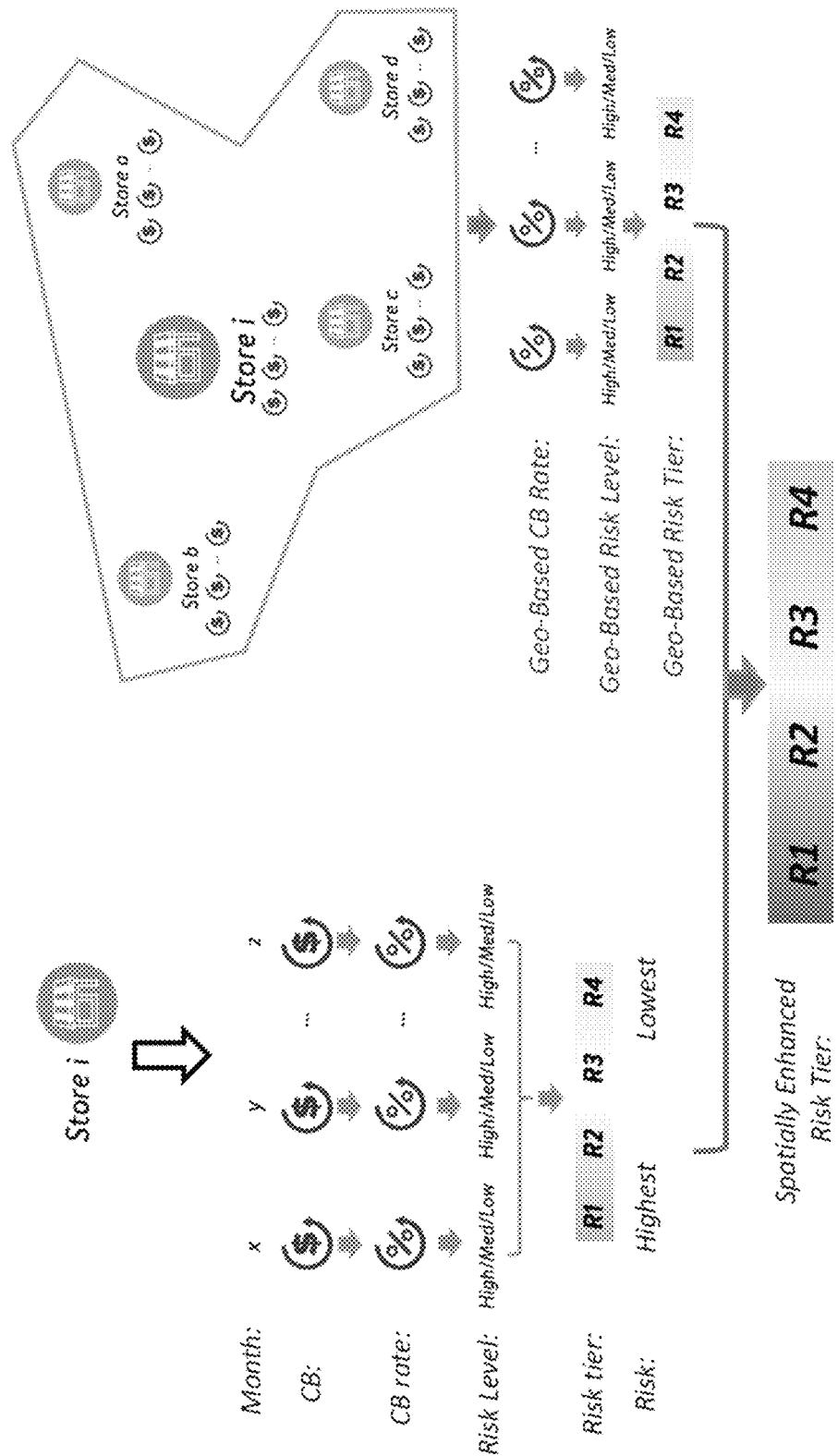
FIG. 5 illustrates a process for computing a spatially enhanced store risk, in accordance with some embodiments of the present teaching.

FIG. 5 illustrates a process for computing a spatially enhanced store risk, in accordance with some embodiments of the present teaching. As shown in FIG. 5, for a store i, chargeback (CB) amount for transactions of store i during past multiple months x, y . . . z, are determined. CB means a return of money to a payer of a transaction, and is a commonly used parameter to measure a payment risk of transactions.

As shown in FIG. 5, based on the CB money mount of each month, a CB rate can be computed for store i at the corresponding month as a percentage of total CB money mount compared to total transaction money amount during that month. For example, the CB rate for store i during month x can be computed according to Equation (1) below.

$$CBrate_{ix} = \frac{CB\ \$_{ix}}{Sales\ \$_{ix}} \quad (1)$$

where CB $\$_{ix}$ represents total CB money amount for store i during month x, and Sales $\$_{ix}$ represents total sales money amount for store i during month x.

Then based on the CB rate of each month, a risk level may be determined for store i at the corresponding month, e.g. as one of three levels: high, median and low. Then based on the risk levels of store i during all of the multiple months, one risk tier can be assigned to store i.

In the example shown in FIG. 5, one of four tiers R1, R2, R3 and R4 is assigned to each store i, based on the risk levels of store i determined for past several months. The four risk tiers R1, R2, R3 and R4 correspond to risks ranked from highest to lowest, respectively in order. In one example, based on risk levels of store i determined for past three months, risk tier R1 is assigned to store i when the three risk levels are all high; risk tier R4 is assigned to store i when the three risk levels are all low; risk tier R2 is assigned to store i when there are more high risk levels than low risk levels; and risk tier R3 is assigned to store i when there are more low risk levels than high risk levels. In other examples, there may be more or less than four risk tiers. In other examples, CB data from more or less than three months may be used.

As discussed above, a big retailer can have many stores distributed across a nation. In some situations, some stores with low CB rate are surrounded by high CB rate stores. As such, even if the CB rate for store i is low, its surrounding stores may have high CB rates. The process shown in FIG. 5 can thus leverage the CB data for both store i itself and surrounding stores within a same predetermined region as store i to determine a spatially enhanced risk tier for store i. In some embodiments, each predetermined region is a core-based statistical area (CBSA), which is geographic area consisting of a core area containing a substantial population nucleus, together with adjacent communities having a high degree of economic and social integration with the core. In other embodiments, each predetermined region may be a state, a county, a city, a zip code, etc. A big retailer can have stores distributed across different regions, and each region may include one or more stores of the retailer.

As shown in FIG. 5, when there are other stores, e.g. stores a, b, c, d, within the same predetermined region as store i, a geo-based CB rate may be computed for store i for each month based on CB data of store i and stores a, b, c, d, during the corresponding month, according to a distance decay model.

For example, the geo-based CB rate for store i during month x can be computed according to Equation (2) below.

$$Geo-based\ CBrate_{ix} = \frac{CB\ \$_{ix} + \sum_{j=1}^{n} CB\ \$_{jx} * f(d_{ij})}{Sales\ \$_{ix} + \sum_{j=1}^{n} Sales\ \$_{jx} * f(d_{ij})} \quad (2)$$

where $f(d_{ij})$ represents a distance decay model based on a distance $d_{ij}$ between store i and store j that is another store in the same region as store i, and n is the total number of stores in the same region except store i itself.

Then based on the geo-based CB rate of each month, a geo-based risk level may be determined for store i at the corresponding month, e.g. as one of three levels: high, median and low. Then based on the geo-based risk levels of store i during all of the past several months, one geo-based risk tier can be assigned to store i. Further as shown in FIG. 5, a spatially enhanced risk tier can be determined for store i based on the risk tier determined based on store i itself and the geo-based risk tier determined based stores within a same region (e.g. same CBSA) including store i. In some embodiments, the process shown in FIG. 5 may be performed every week, every month, every quarter, or every year.

Figure 6A:
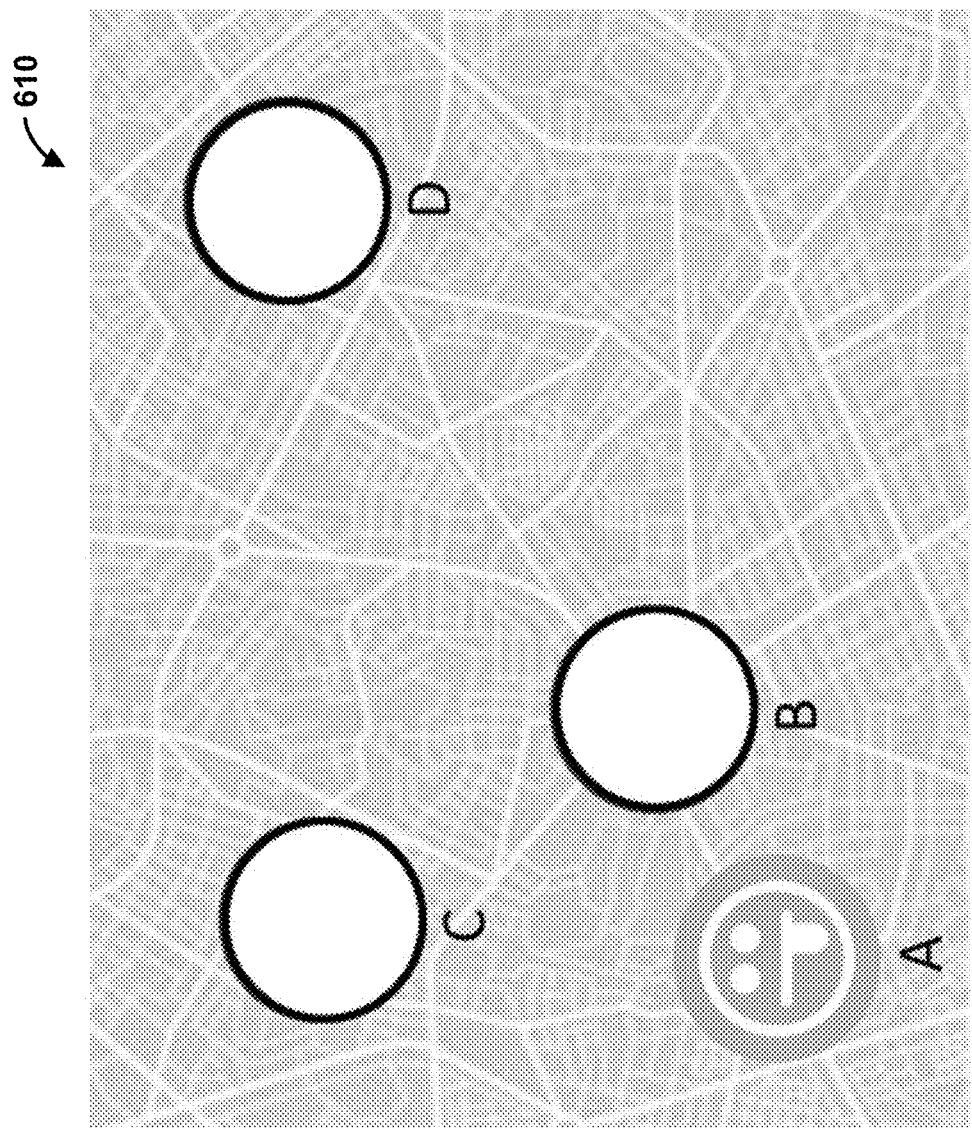
FIG. 6A and FIG. 6B illustrate an exemplary distance decay model for computing a spatially enhanced store risk, in accordance with some embodiments of the present teaching.
Figure 6B:
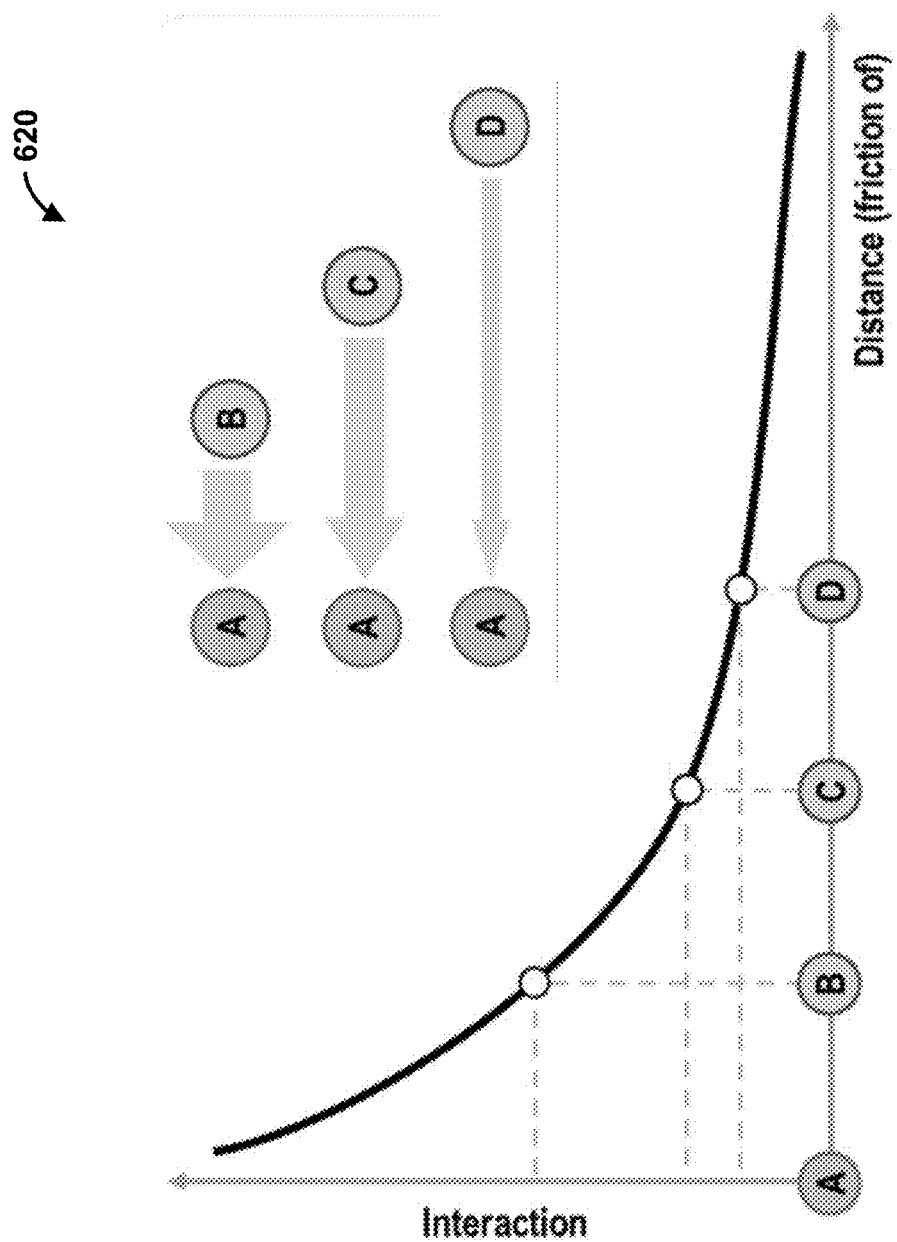

FIG. 6A and FIG. 6B illustrate an exemplary distance decay model for computing a spatially enhanced store risk, e.g. the spatially enhanced risk tier in FIG. 5, in accordance with some embodiments of the present teaching. FIG. 6A shows a map 610 including four stores A, B, C, D located therein. In some embodiments, it can be assumed that the interaction between two stores declines as the distance in-between increases. For example, to store A, the interactions from stores B, C, D decline in order because their respective distances to store A increase in the same order, as shown in the plot 620 of distance decay model in FIG. 6B.

In some embodiments, the distance decay model shown in FIG. 6B can be described as Equation (3) below.

$$f(d_{ij}) = \alpha \frac{1}{d_{ij}^{\beta}} \qquad (3)$$

where $d_{ij}$ represents a distance between two locations i and j, $\alpha$ and $\beta$ describe the influence of distance and different patterns of decay. The distance decay model $f(d_{ij})$ in Equation (3) can be used in Equation (2).

In some embodiments, additional factors may be considered when computing the distance decay model, as shown in Equation (4) below.

$$f(d_{ij}) = \alpha \frac{1}{d_{ij}^{\beta}} \cdot \prod_{k=0}^{n} \text{factor}_{k,ij} \qquad (4)$$

where $\text{factor}_{k,ij}$ represents a factor k with respect to two locations i and j, k=0 . . . n. In some examples, the factors in Equation (4) when being applied for a store may include: store assortment like range and variety of products at the store, variety of service, accessibility like available transportation options to the store, and neighborhood characteristics of the store. The distance decay model $f(d_{ij})$ in Equation (4) can be used in Equation (2).

In some embodiments, the parameters $\alpha$ and $\beta$ in Equations (3) and (4) can be pre-trained using a machine learning model based on historical and current CB rates. In some embodiments, the distance decay model may be part of the spatial model 392 stored in the database 116, or may be a separate model stored in the database 116.

Figure 7:
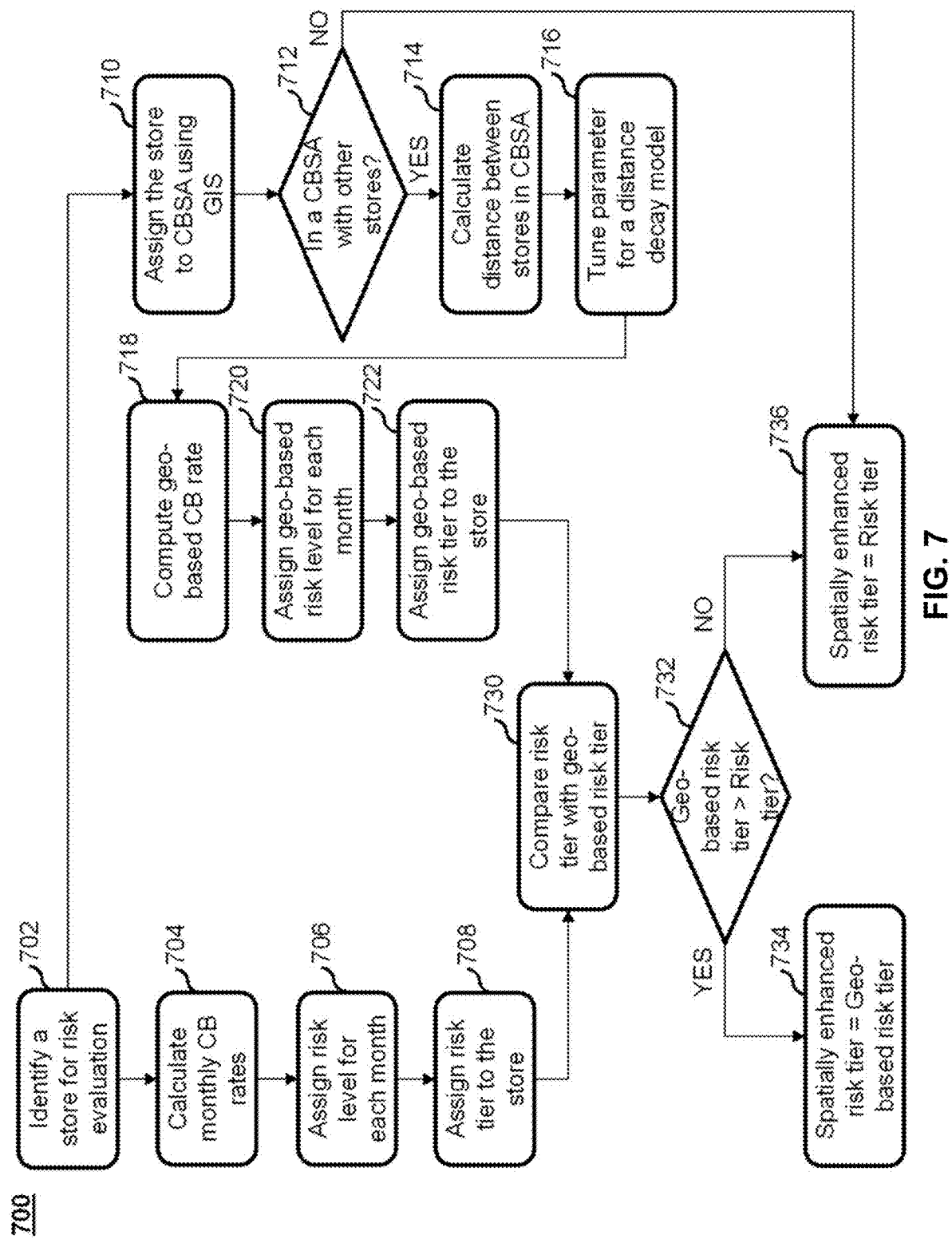
FIG. 7 is a flowchart illustrating an exemplary method for computing a spatially enhanced store risk, in accordance with some embodiments of the present teaching.

FIG. 7 is a flowchart illustrating an exemplary method 700 for computing a spatially enhanced store risk, in accordance with some embodiments of the present teaching. In some embodiments, the method 700 can be carried out by one or more computing devices, such as the payment risk computing device 102 and/or the cloud-based engine 121 of FIG. 1. Beginning at operation 702, a store is identified for risk evaluation. Then the process may proceed to operations 704 and 710 in parallel. In some embodiments, the operations 704 to 708 can be performed in parallel with the operations 710 to 722.

At operation 704, monthly CB rates are calculated for the store, e.g. as discussed above with respect to FIG. 5. Based on the monthly CB rates, a risk level is assigned at operation 706 to the store for each month, e.g. as discussed above with respect to FIG. 5. At operation 708, a risk tier is assigned to the store based on the multi-month risk levels, e.g. as discussed above with respect to FIG. 5. The risk tier is then sent to operation 730 for comparison.

At operation 710, the store is assigned to a CBSA, or another predetermined region, using a geographic information science (GIS) service, e.g. the global positioning system (GPS) service. It is then determined at operation 712 whether the store is in a CBSA with at least one additional store. If it is determined at operation 712 that the store is not in a CBSA or is the only store in its CBSA, then the process goes directly to operation 736 to determine a spatially enhanced risk tier for the store to be the same as the risk tier assigned to the store at operation 708.

If it is otherwise determined at operation 712 that the store is in a CBSA with at least one additional store, the process moves on to operation 714 to calculate a distance between stores in the CBSA, e.g. a distance between the store and each additional store in the CBSA. Then at operation 716, parameters are tuned for a distance decay model, e.g. as shown in Equation (3) or (4). At operation 718, a geo-based CB rate is computed for the store based on the distance decay model and the CB rates of all stores in the CBSA, e.g. as discussed above with respect to FIG. 5. Then a geo-based risk level is assigned at operation 720 to the store for each month based on the geo-based CB rates. At operation 722, a geo-based risk tier is assigned to the store based on the multi-month geo-based risk level, e.g. as discussed above with respect to FIG. 5. The geo-based risk tier is then sent to operation 730 for comparison.

At operation 730, the risk tier generated from the operation 708 is compared to the geo-based risk tier generated from the operation 722. It is determined at operation 732 whether the geo-based risk tier is larger than the risk tier. If so, the process goes to operation 734 to determine the spatially enhanced risk tier for the store to be the same as the geo-based risk tier assigned to the store at operation 722. If not, the process goes to operation 736 to determine the spatially enhanced risk tier for the store to be the same as the risk tier assigned to the store at operation 708.

For method 700, when the geo-based risk tier is larger than the risk tier at operation 732 (e.g. geo-based risk tier=R1, and risk tier=R2), the store has a higher risk after integrating nearby stores' CB data. This will enhance the risk tier score for the store, e.g. R2→R1 or R3→R2.

Table I below shows a performance comparison between the spatial-enhanced method 700 and an old method where no neighboring store's CD data is considered. As shown in Table I, at least 600 (14%) of the stores' risk tiers are enhanced after incorporating CB data from neighboring stores.

TABLE I

|  |  | Spatial-enhanced method | | | | | |
|---|---|---|---|---|---|---|---|
|  |  | r1 | r2 | r3 | r4 | Total | |
| Old method | r1 | 431 |  |  |  | 431 | 9% |
|  | r2 | 129 | 574 |  |  | 703 | 15% |
|  | r3 |  | 335 | 1992 |  | 2327 | 51% |
|  | r4 |  |  | 151 | 963 | 1114 | 24% |
|  | Total | 560 | 909 | 2143 | 963 | 4575 |  |
|  |  | 12% | 20% | 47% | 21% |  |  |

In some embodiments, the method 700 is performed based on the spatial model 392 in the database 116 to integrate the nearby stores' risk levels as spatial signal to enrich the store risk tier, rather than merely considering the store's risk tier by itself. This framework in the method 700 can be applied to other products and domains involving physical locations.

Figure 8:
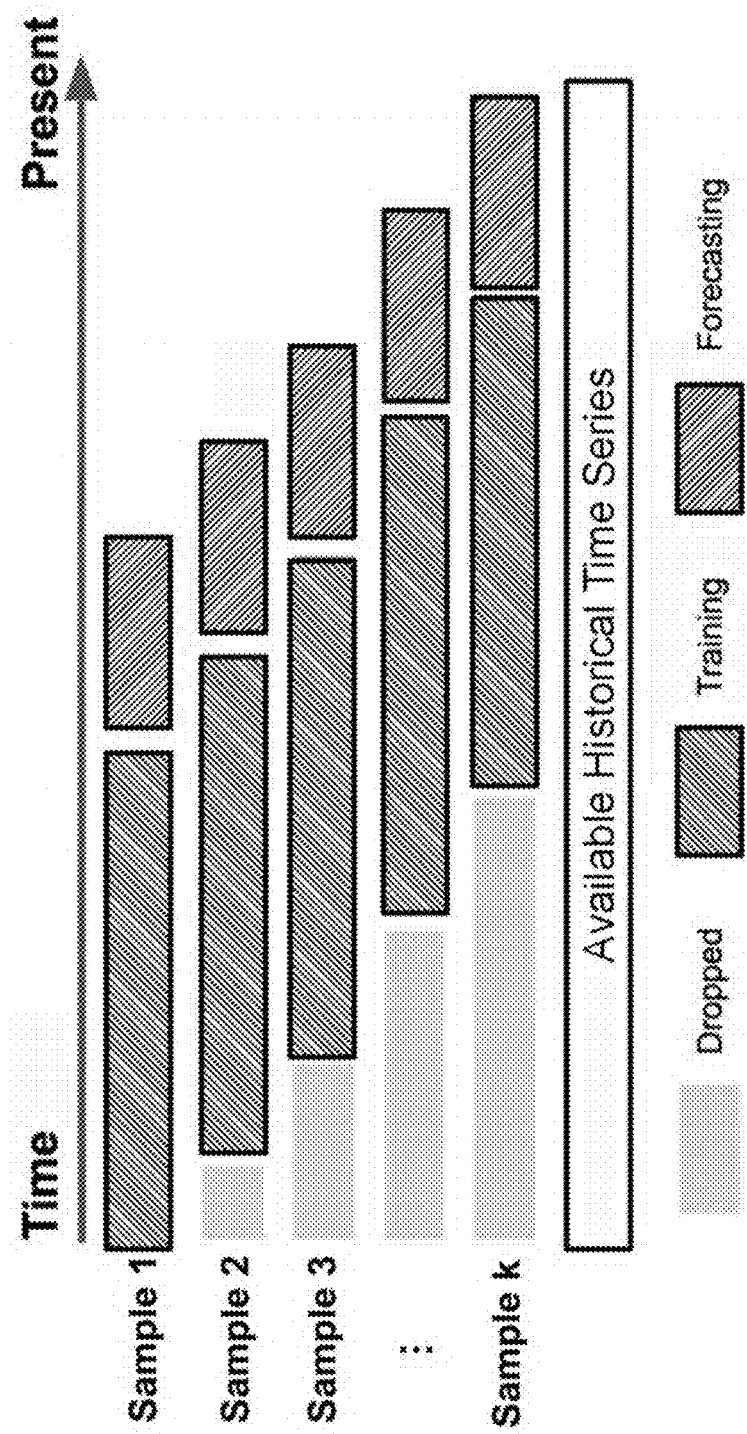
FIG. 8 illustrates a time series of chargeback data used for store risk prediction, in accordance with some embodiments of the present teaching.

FIG. 8 illustrates a time series of chargeback data used for store risk prediction, in accordance with some embodiments of the present teaching. As discussed above, temporal factors can be considered when computing a store risk score for a store. One exemplary objective when using temporal factors is to forecast a future store risk tier based on historical CB rates, e.g. CB rates in past 3 months. As shown in FIG. 8, as time goes by, CB rates in remote past, e.g. older than 3 months, will be dropped; and only the CB rates in the most recent 3 months are used for training a temporal model, e.g. the temporal model 394 in the database 116, to forecast the CB rate in next month.

Figure 9:
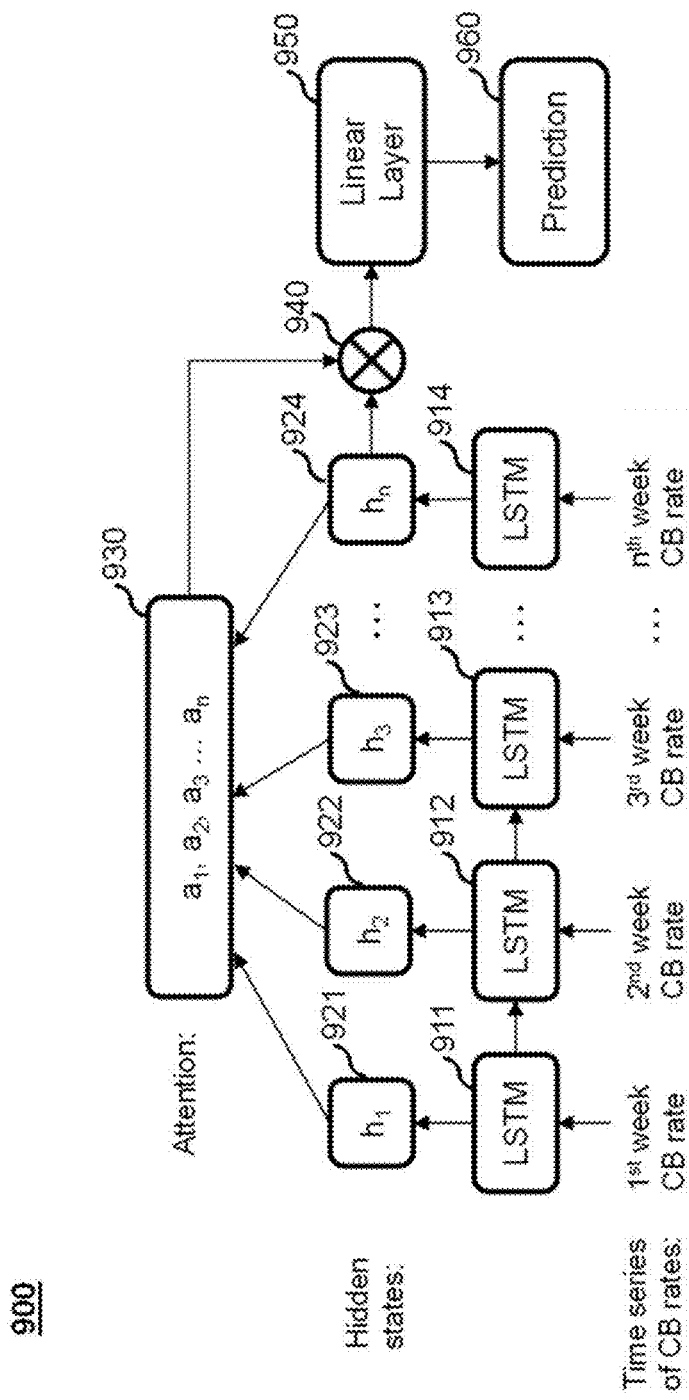
FIG. 9 illustrates a structure of a sequence model used for store risk prediction, in accordance with some embodiments of the present teaching.

FIG. 9 illustrates a structure of a sequence model 900 used for store risk prediction, in accordance with some embodiments of the present teaching. In some embodiments, the sequence model 900 is a deep learning model that can leverage the temporal information in the historical CB record to enhance the risk tier prediction accuracy. In this example, the sequence model 900 relied on a recurrent neural network based on long short-term memory (LSTM).

As shown in FIG. 9, a time series of CB rates for a store are aggregated by week and fed into different LSTM units 911-914 of the sequence model 900. For example, the first week's CB rates are fed into the LSTM unit 911; the second week's CB rates are fed into the LSTM unit 912; the third week's CB rates are fed into the LSTM unit 913; . . . the n_th week's CB rates are fed into the LSTM unit 914. In some examples, the time series include weekly CB rates for the store during the past 3 months or 12 weeks.

Figure 10:
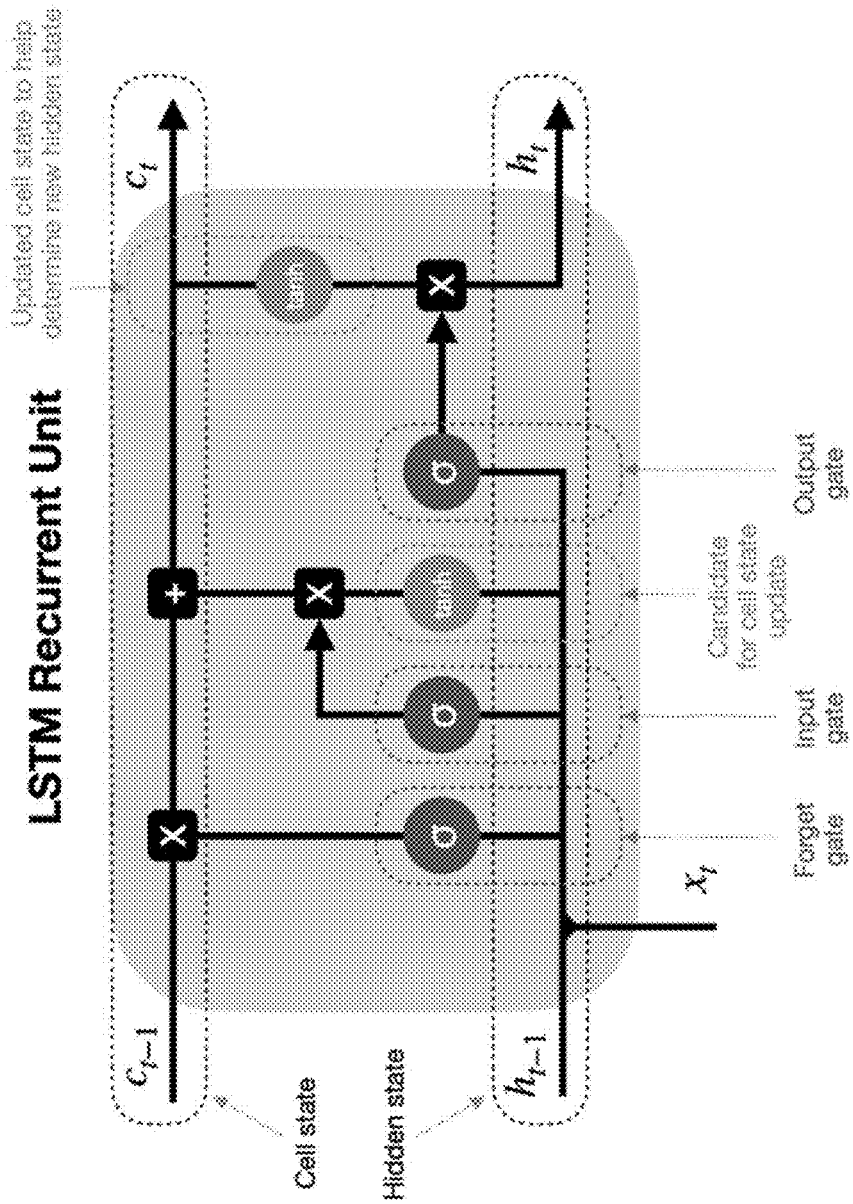
FIG. 10 illustrates a structure of a long short-term memory neural network for store risk prediction, in accordance with some embodiments of the present teaching.

In some embodiments, each LSTM unit may have a same structure as an LSTM recurrent unit shown in FIG. 10. A neural network based on LSTM can use gates to control the flow of information, by selectively adding or removing information with each recurrent LSTM unit.

As shown in FIG. 10, a hidden state from a previous timestep (h_t−1) and the input at a current timestep (x_t) are combined before passing copies of it through various gates. The combination first goes through a forget gate, which controls what information should be forgotten. Since the sigmoid function ranges between 0 and 1, it sets which values in the cell state should be discarded (multiplied by 0), remembered (multiplied by 1), or partially remembered (multiplied by some value between 0 and 1). The combination then goes through an input gate, which helps to identify important elements that need to be added to the cell state. The results of the input gate get multiplied by the cell state candidate, with only the information deemed important by the input gate being added to the cell state. The previous cell state (c_t−1) gets multiplied by the results of the forget gate. Then new information is added from [input gate×cell state candidate] to get the latest cell state (c_t). Then, to update hidden state, the latest cell state (c_t) is passed through the tanh activation function and multiplied by the results of the output gate.

When a same LSTM recurrent unit is re-used, the latest cell state (c_t) and the latest hidden state (h_t) may go back into the recurrent unit, and the process repeats at timestep t+1. Referring back to FIG. 9, the latest cell state (c_t) output by a previous LSTM is an input as the previous cell state for the next LSTM. For example, the updated cell state output by the LSTM 911 is an input cell state for the LSTM 912. For implementation, the LSTM units 911-914 in FIG. 9 may be implemented using one or more LSTM structures as shown in FIG. 10.

Referring back to FIG. 9, in some embodiments, the weekly CB rates are fed into LSTM units 911-914 one-by-one in order. First, the first week's CB rate for the store is fed into the LSTM 911, which will compute to output the hidden state h1 921 and an updated cell state for the first week. The LSTM 912 will then obtain the second week's CB rate for the store and compute, based on the hidden state h1 921 and the updated cell state from the LSTM 911, to output the hidden state h2 922 and an updated cell state for the second week. Then, the LSTM 913 will obtain the third week's CB rate for the store and compute, based on the hidden state h2 922 and the updated cell state from the LSTM 912, to output the hidden state h3 923 and an updated cell state for the third week. The process continues until reaching the n_th week, which may be a current week. The LSTM 914 obtains the n_th week's CB rate for the store and compute, based on the previous hidden state and the updated cell state from the (n−1)_th week, to output the hidden state h_n 924 and an updated cell state for the n_th week.

In some examples, when most recent 12 weeks' CB rates are used for CB rate prediction, e.g. for next week, when the 13_th week CB rate is in, the $1^{st}$ week CB rate will be forgotten by the forget gate in the LSTM unit receiving the 13_th week CB rate. As such, the LSTM based neural network can get rid of their irrelevant information (e.g. remote past CB rates) but maintain some important information (e.g. recent CB rates) into the long dependency in the time series.

As shown in FIG. 9, the sequence model 900 further includes an attention function unit 930 for computing attention weights a1, a2, a3, . . . a_n, corresponding to hidden states h1, h2, h3, . . . h_n, respectively. This self-attention mechanism can identify and attend to the most pertinent information in an input.

Figure 11:
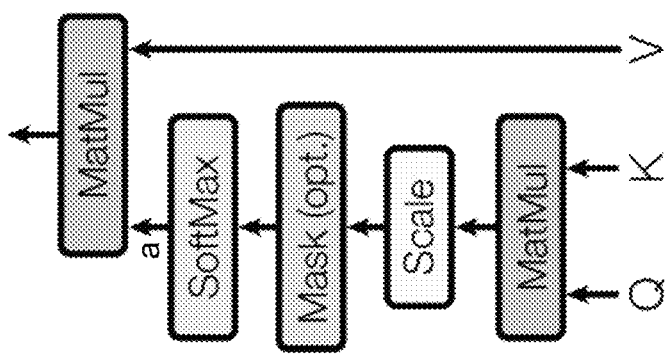
FIG. 11 illustrates a method for computing an attention-weighted output in a sequence model used for store risk prediction, in accordance with some embodiments of the present teaching.

FIG. 11 illustrates a method for computing an attention-weighted output in a sequence model used for store risk prediction, in accordance with some embodiments of the present teaching. This is a scaled dot-product attention function, whose inputs include queries (Q), keys (K) and values (V). In some embodiments, Q, K and V are vectors or matrices computed based on transformations of each hidden state hi, at each weekly timestamp i, i=1, 2, 3 . . . n. Q and K may be used to compute an attention weight ai corresponding to the hidden state hi. For example, as shown in FIG. 11, the attention weight may be computed by: computing a dot product of Q and K, dividing the dot product by $\sqrt{d_k}$, and applying a softmax function to obtain the attention weight, where $d_k$ is the dimension of Q and K. As such, the matrix of outputs can be computed as Equation (5) shown below.

$$\text{Attention}(Q, K, V) = \text{softmax}\left(\frac{QK^T}{\sqrt{d_k}}\right)V \qquad (5)$$

The output of Equation (5) may correspond to the attention-weighted values at operation 940, at timestamp n. Then, some linear layer 950 may be applied to the attention-weighted values to generate a CB rate prediction of the store at operation 960, e.g. for next week or next month.

As such, the LSTM network as shown in FIG. 9 with self-attention mechanism can predict future CB rate for a store based on weekly CB rate sequence of the store, without creating many features and rules like traditional rule-based machine learning model. While weekly CB rates for the store can go up and down, at each timestamp, the LSTM network can update the hidden layer including updated hidden states and update the attention weights to predict for the next timestamp. At the final step (n_th week or most recent week), the LSTM network combines all the input sequence with attention weights to give the final prediction. In some embodiments, the input sequence may include CB rates of more or less than 3 months.

Table II below shows a performance comparison between the sequence model shown in FIG. 9 and a rule-based model for CB rate prediction. As shown in Table II, the sequence model has better performance than the rule-based model, in terms of both precision rate (accuracy rate of risky store prediction) and recall rate (capture rate of risky stores), where F1 is a combination of the precision rate and the recall rate.

TABLE II

| Risk Tier | Sequence Model | | | Rule-based Model | | |
|---|---|---|---|---|---|---|
| | Precision | Recall | F1 | Precision | Recall | F1 |
| R1 | 0.95 | 0.85 | 0.90 | 0.07 | 0.78 | 0.12 |
| R2 | 0.84 | 0.72 | 0.77 | 0.05 | 0.17 | 0.08 |
| R3 | 0.6 | 0.7 | 0.65 | 0.22 | 0.09 | 0.13 |
| R4 | 0.84 | 0.79 | 0.82 | 0.83 | 0.46 | 0.59 |

Figure 12:
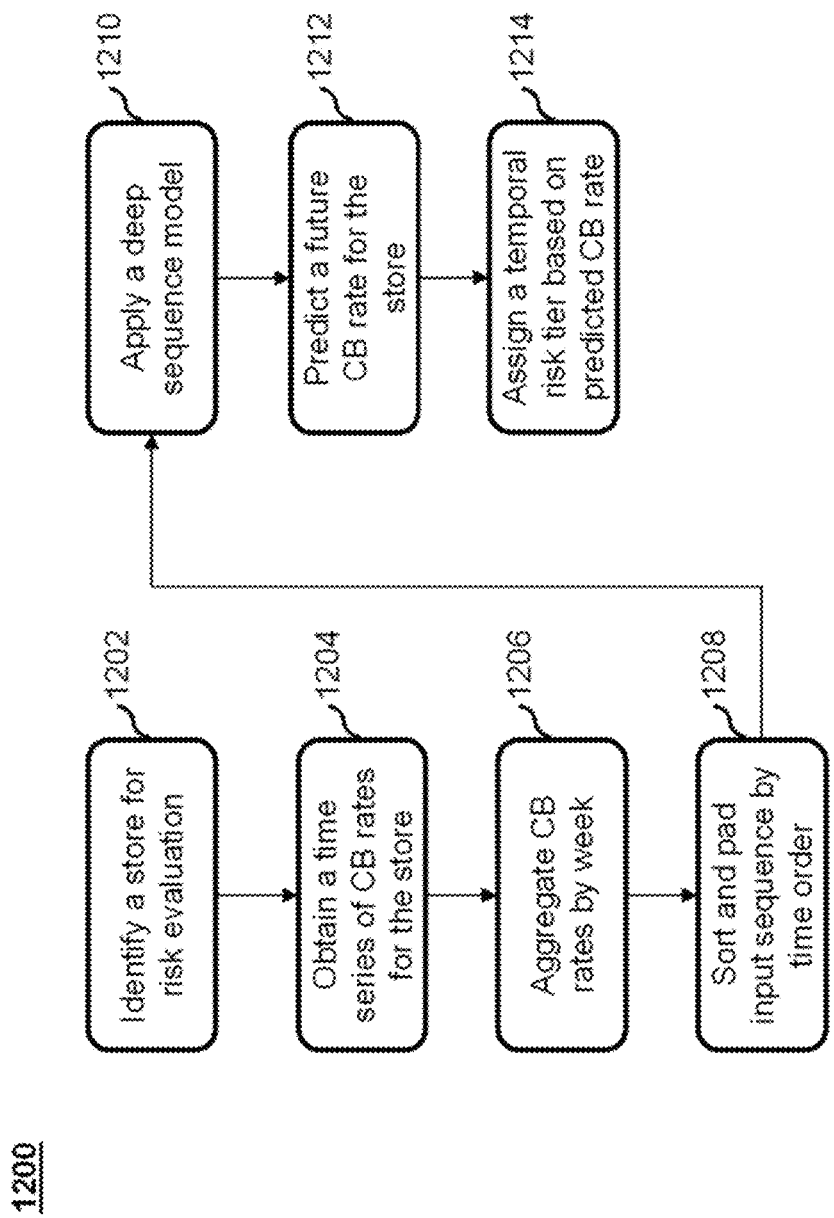
FIG. 12 is a flowchart illustrating an exemplary method for computing a temporally enhanced store risk, in accordance with some embodiments of the present teaching.

FIG. 12 is a flowchart illustrating an exemplary method 1200 for computing a temporally enhanced store risk, in accordance with some embodiments of the present teaching. In some embodiments, the method 1200 can be carried out by one or more computing devices, such as the payment risk computing device 102 and/or the cloud-based engine 121 of FIG. 1. Beginning at operation 1202, a store is identified for risk evaluation. A time series of CB rates are obtained at operation 1204 for the store. The CB rates are aggregated at operation 1206 by week. At operation 1208, the CB rates are sorted and padded as an input sequence by time order. At operation 1210, a deep sequence model, e.g. the one shown in FIG. 9, is applied to the input CB rate sequence. At operation 1212, a future CB rate is predicted for the store based on the deep sequence model. At operation 1214, a temporal risk tier is assigned to the store based on the predicted CB rate.

Figure 13:
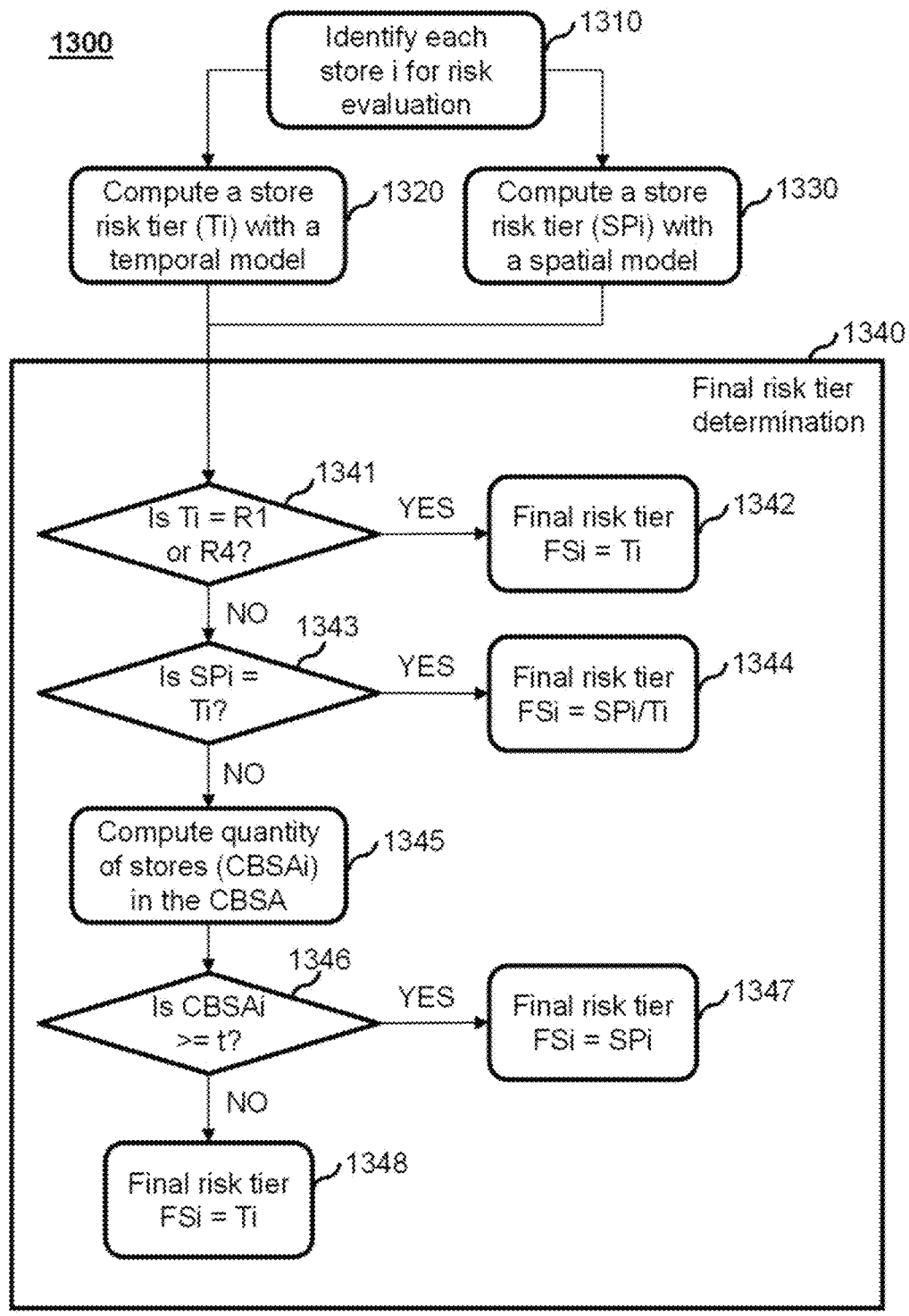
FIG. 13 is a flowchart illustrating an exemplary method for computing a final store risk based on a spatially enhanced store risk and a temporally enhanced store risk, in accordance with some embodiments of the present teaching.

FIG. 13 is a flowchart illustrating an exemplary method 1300 for computing a final store risk based on a spatially enhanced store risk and a temporally enhanced store risk, in accordance with some embodiments of the present teaching. In some embodiments, the method 1300 can be carried out by one or more computing devices, such as the payment risk computing device 102 and/or the cloud-based engine 121 of FIG. 1. Beginning at operation 1310, each store i is identified for risk evaluation. For store i, a store risk tier (Ti) may be computed at operation 1320 with a temporal model; while another store risk tier (SPi) may be computed at operation 1330 with a spatial model. In some embodiments, the operation 1320 and the operation 1330 may be performed in parallel. In some embodiments, the operation 1320 may follow a similar process as shown in FIG. 12; while the operation 1330 may follow a similar process as shown in FIG. 7. The risk tiers Ti and SPi are both input to the operation 1340 for final risk tier determination.

As shown in FIG. 13, the operation 1340 may include further operations 1341-1348. At operation 1341, it is determined whether the temporal risk tier Ti is equal to R1 (tier with the highest risk) or R4 (tier with the lowest risk). If so, the process goes to operation 1342 to compute the final risk tier FSi=Ti, assuming the temporal model has a very good prediction at a very risky tier and a very safe tier. If not, the process goes to operation 1343 to determine whether the spatial risk tier SPi is the same as the temporal risk tier Ti. If so, i.e. SPi=Ti, then the process goes to operation 1344 to compute the final risk tier FSi=SPi or Ti.

If SPi is not equal to Ti at operation 1343, the process goes to operation 1345 to compute a quantity of stores (CBSAi) in the CBSA where the store i belongs to. Then at operation 1346, it is determined whether CBSAi is larger than or equal to a predetermined threshold t. If so, the process goes to operation 1347 to compute the final risk tier FSi=SPi. If not, the process goes to operation 1348 to compute the final risk tier FSi=Ti. In some embodiments, the threshold t may be 3 or more.

In some embodiments, the final risk tier FSi may be leveraged by a payment risk model, e.g. the payment risk model 398 in the database 116, as one intelligent feature to tighten up fraud control based on neighborhood store information and store risk trends. In some embodiments, the fraud control is only tightened up for stores with the highest risk tier, e.g. FSi=R1.

In some embodiments, the final risk tier FSi may be leveraged to accept or decline a transaction in combination with other factors. For example, a transaction will be declined or challenged when FSi=R1 and at least one additional factor indicates risky for the transaction.

Figure 14:
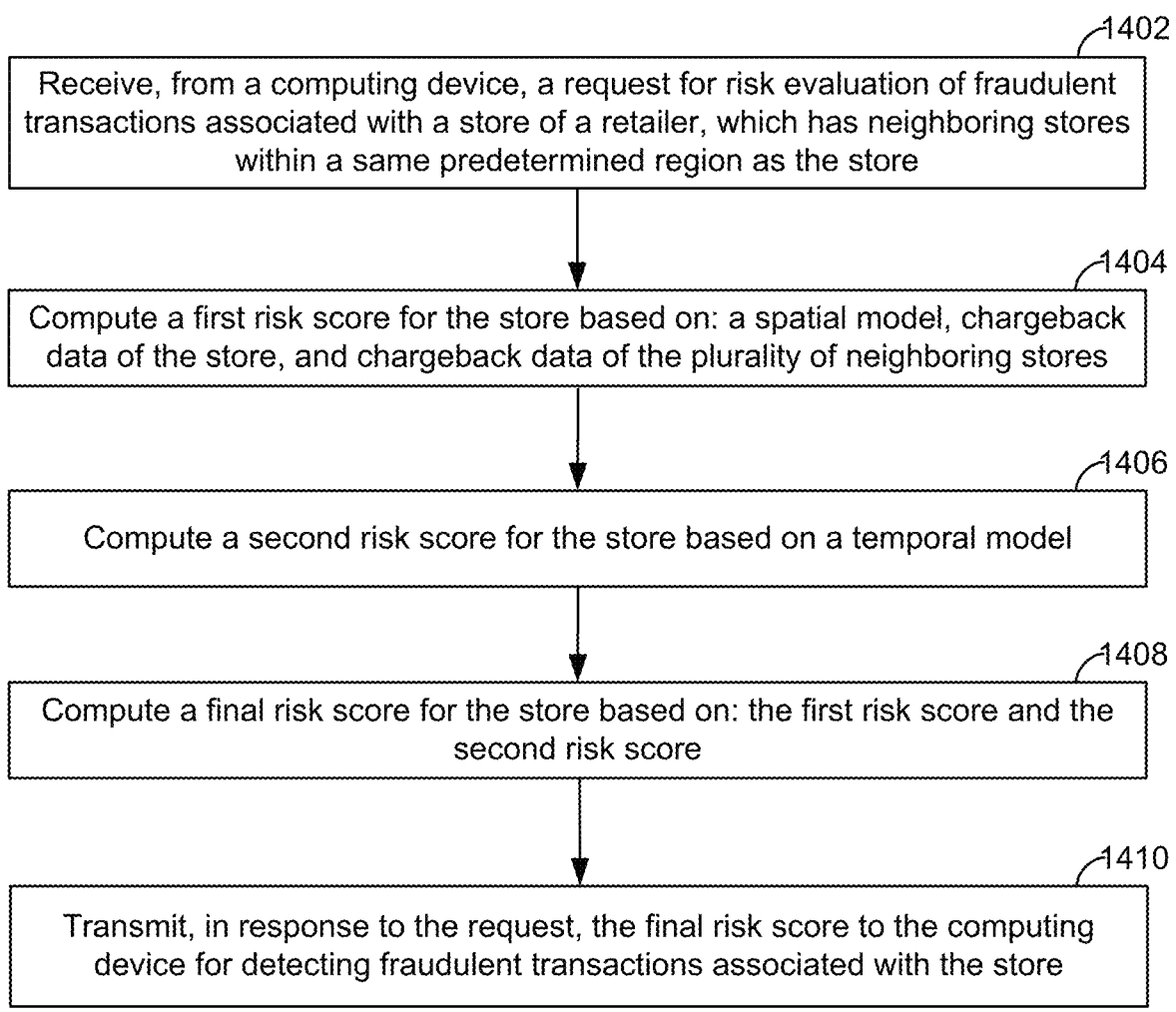
FIG. 14 is a flowchart illustrating an exemplary method for evaluating payment risks of store transactions, in accordance with some embodiments of the present teaching.

FIG. 14 is a flowchart illustrating an exemplary method 1400 for evaluating payment risks of store transactions, in accordance with some embodiments of the present teaching. In some embodiments, the method 1400 can be carried out by one or more computing devices, such as the payment risk computing device 102 and/or the cloud-based engine 121 of FIG. 1. Beginning at operation 1402, a request is received for risk evaluation of fraudulent transactions associated with a store of a retailer. The retailer has neighboring stores within a same predetermined region as the store. The request may be received from a computing device associated with the retailer or the store. At operation 1404, a first risk score may be computed for the store based on: a spatial model, chargeback data of the store, and chargeback data of the plurality of neighboring stores. At operation 1406, a second risk score may be computed for the store based on a temporal model. A final risk score is then computed at operation 1408 for the store based on: the first risk score and the second risk score. At operation 1410, the final risk score is transmitted to the computing device for detecting fraudulent transactions associated with the store, in response to the request.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:
   a non-transitory memory having instructions stored thereon; and
   at least one processor operatively coupled to the non-transitory memory, and configured to read the instructions to:
   receive a request for risk evaluation of transaction data processed by one or more computing devices associated with a physical location located within a predetermined region, the predetermined region further including a plurality of neighboring locations;
   implement a spatial model to generate a first risk score for the physical location, wherein the spatial model is configured to receive chargeback data of the physical location and chargeback data of the plurality of neighboring locations, wherein the first risk score indicates a first rate of processing the chargeback data of the physical location by the one or more computing devices for respective fraudulent transactions;
   implement a temporal model to generate a second risk score for the physical location that includes an aggregated rate of processing the chargeback data of the physical location by the one or more computing devices for the respective fraudulent transactions;
   wherein the processor includes a plurality of model units to implement the temporal model;
   wherein each of the plurality of model units includes a forget gate, an input gate, and an output gate;
   wherein for each model unit at each timestep when implementing the temporal model:
   the forget gate is configured to generate a first result based on a combination of a previous hidden state and a current input of chargeback rate into the forget gate,
   the input gate is configured to generate a second result based on the combination,
   a current cell state is determined based on a previous cell state, the first result, and the second result,
   the output gate is configured to generate a third result based on the combination, and
   a current hidden state is determined based on the current cell state and the third result;
   generate a final risk score for processing the chargeback data of the physical location based on the first risk score and the second risk score;
   transmit, in response to the request, the final risk score to a first computing device of the one or more computing devices associated with the physical location;
   based on the final risk score, detect, in the transaction data, a subset of the transaction data that correspond to the respective fraudulent transactions associated with the physical location; and
   adjust a fraud control policy for processing the transaction data associated with the physical location.

2. The system of claim 1, wherein the final risk score is generated by a trained risk model configured to receive the first risk score and the second risk score.

3. The system of claim 1, wherein the processor is configured to generate a transaction risk score for a transaction associated with the physical location based on the final risk score and transaction specific data.

4. The system of claim 1, wherein the spatial model is configured to generate a chargeback-based risk score and a geo-based risk score, wherein the first risk score is selected as a higher of the chargeback-based risk score or the geo-based risk score.

5. The system of claim 4, wherein the spatial model comprises a distance decay model configured to generate the geo-based risk score based on chargeback rates for each of the plurality of neighboring locations.

6. The system of claim 1, wherein the temporal model is configured to generate the second risk score based on time series chargeback data.

7. The system of claim 6, wherein the temporal model comprises a trained sequence model.

8. The system of claim 7, wherein the trained sequence model comprises a deep learning model configured to generate an attention weighted output.

9. A computer-implemented method for protecting computing devices from processing abnormal data, comprising:
   receiving a request for risk evaluation of transaction data processed by one or more computing devices associated with a physical location located within a predetermined region, the predetermined region further including a plurality of neighboring locations;
   implementing a spatial model to generate a first risk score for the physical location, wherein the spatial model is configured to receive chargeback data of the physical location and chargeback data of the plurality of neighboring locations, wherein the first risk score indicates a first rate of processing the chargeback data of the physical location by the one or more computing devices for respective fraudulent transactions;
   implementing a temporal model to generate a second risk score for the physical location that includes an aggregated rate of processing the chargeback data of the physical location by the one or more computing devices for the respective fraudulent transactions;
   wherein the temporal model comprises a plurality of model units each including a forget gate, an input gate, and an output gate;
   wherein implementing the temporal model comprises, for each model unit at each timestep:
   generating, by the forget gate, a first result based on a combination of a previous hidden state and a current input of chargeback rate into the forget gate,
   generating, by the input gate, a second result based on the combination, determining a current cell state based on a previous cell state, the first result, and the second result, generating, by the output gate, a third result based on the combination, and determining a current hidden state based on the current cell state and the third result;

generating a final risk score for processing the chargeback data of the physical location based on the first risk score and the second risk score;

transmitting, in response to the request, the final risk score to a first computing device of the one or more computing devices associated with the physical location;

based on the final risk score, detecting, in the transaction data, a subset of the transaction data that correspond to the respective fraudulent transactions associated with the physical location; and adjusting a fraud control policy for processing the transaction data associated with the physical location.

10. The computer-implemented method of claim 9, wherein the final risk score is generated by a trained risk model configured to receive the first risk score and the second risk score.

11. The computer-implemented method of claim 9, comprising generating a transaction risk score for a transaction associated with the physical location based on the final risk score and transaction specific data.

12. The computer-implemented method of claim 9, wherein the spatial model is configured to generate a chargeback-based risk score and a geo-based risk score, wherein the first risk score is selected as a higher of the chargeback-based risk score or the geo-based risk score.

13. The computer-implemented method of claim 12, wherein the spatial model comprises a distance decay model configured to generate the geo-based risk score based on chargeback rates for each of the plurality of neighboring locations.

14. The computer-implemented method of claim 9, wherein the temporal model is configured to generate the second risk score based on time series chargeback data.

15. The computer-implemented method of claim 14, wherein the temporal model comprises a trained sequence model, and the trained sequence model comprises a deep learning model configured to generate an attention weighted output.

16. The computer-implemented method of claim 9, wherein:

the plurality of model units forms a sequence;

a current cell state output by a previous model unit in the sequence is input as a previous cell state to a next model unit in the sequence; and the temporal model comprises an attention function unit configured to aggregate all current hidden states output by the plurality of model units to generate the aggregated rate of processing the chargeback data.

17. A non-transitory computer readable medium having instructions stored thereon, wherein the instructions, when executed by at least one processor, cause at least one device to perform operations comprising:

receiving a request for risk evaluation of transaction data processed by one or more computing devices associated with a physical location located within a predetermined region, the predetermined region further including a plurality of neighboring locations;

implementing a spatial model to generate a first risk score for the physical location, wherein the spatial model is configured to receive chargeback data of the physical location and chargeback data of the plurality of neighboring locations, wherein the first risk score indicates a first rate of processing the chargeback data of the physical location by the one or more computing devices for respective fraudulent transactions;

implementing a temporal model to generate a second risk score for the physical location that includes an aggregated rate of processing the chargeback data of the physical location by the one or more computing devices for the respective fraudulent transactions;

wherein the temporal model comprises a plurality of model units each including a forget gate, an input gate, and an output gate;

wherein implementing the temporal model comprises, for each model unit at each timestep:

generating, by the forget gate, a first result based on a combination of a previous hidden state and a current input of chargeback rate into the forget gate, generating, by the input gate, a second result based on the combination, determining a current cell state based on a previous cell state, the first result, and the second result, generating, by the output gate, a third result based on the combination, and determining a current hidden state based on the current cell state and the third result;

generating a final risk score for processing the chargeback data of the physical location based on the first risk score and the second risk score;

transmitting, in response to the request, the final risk score to a first computing device of the one or more computing devices associated with the physical location;

based on the final risk score, detecting, in the transaction data, a subset of the transaction data that correspond to the respective fraudulent transactions associated with the physical location; and adjusting a fraud control policy for processing the transaction data associated with the physical location.

18. The non-transitory computer readable medium of claim 17, wherein the spatial model is configured to generate a chargeback-based risk score and a geo-based risk score, wherein the first risk score is selected as a higher of the chargeback-based risk score or the geo-based risk score.

19. The non-transitory computer readable medium of claim 17, wherein the temporal model is configured to generate the second risk score based on time series chargeback data.

20. The non-transitory computer readable medium of claim 19, wherein the temporal model comprises a trained sequence model.

* * * * *